United States Patent
Carbune et al.

(10) Patent No.: US 12,489,720 B2
(45) Date of Patent: Dec. 2, 2025

(54) INFERRING ASSISTANT ACTION(S) BASED ON AMBIENT SENSING BY ASSISTANT DEVICE(S)

(71) Applicant: Google LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 271 days.

(21) Appl. No.: 17/185,611

(22) Filed: Feb. 25, 2021

(65) Prior Publication Data

US 2022/0272055 A1    Aug. 25, 2022

(51) Int. Cl.
| | |
|---|---|
| G06F 3/16 | (2006.01) |
| G06F 3/0484 | (2022.01) |
| G06N 20/00 | (2019.01) |
| G10L 15/16 | (2006.01) |
| G10L 15/18 | (2013.01) |
| H04L 51/02 | (2022.01) |
| H04M 1/72454 | (2021.01) |

(52) U.S. Cl.
CPC ............ *H04L 51/02* (2013.01); *G06F 3/0484* (2013.01); *G10L 15/16* (2013.01); *G10L 15/18* (2013.01)

(58) Field of Classification Search
CPC ......... G06F 3/0484; G06N 5/04; H04L 51/02; G10L 15/16; G10L 15/18
See application file for complete search history.

(56) References Cited

U.S. PATENT DOCUMENTS

| | | | |
|---|---|---|---|
| 10,163,437 B1 | 12/2018 | St. Angel et al. | |
| 11,133,020 B2* | 9/2021 | Mitchell | G10L 25/51 |
| 2014/0052681 A1* | 2/2014 | Nitz | H04L 51/02 |
| | | | 706/46 |
| 2016/0291671 A1* | 10/2016 | Rider | G06F 1/3209 |
| 2018/0091638 A1* | 3/2018 | Torres | H04W 52/0251 |

(Continued)

OTHER PUBLICATIONS

European Patent Office; International Search Report and Written Opinion of Application No. PCT/US2021/060321; 12 pages; dated Mar. 24, 2022.

(Continued)

*Primary Examiner* — Nhat Huy T Nguyen
(74) *Attorney, Agent, or Firm* — Gray Ice Higdon

(57) ABSTRACT

Implementations can determine an ambient state that reflects a state of a user and/or an environment of the user based on an instance of sensor data. The ambient state can be processed, using an ambient sensing machine learning (ML) model, to generate suggested action(s) that are suggested to be performed, on behalf of the user, by an automated assistant. In some implementations, a corresponding representation of the suggested action(s) can be provided for presentation to the user, and the suggested action(s) can be performed by the automated assistant in response to a user selection of the suggested action(s). In additional or alternative implementations, the suggested action(s) can be automatically performed by the automated assistant. Implementations can additionally or alternatively generate training instances for training the ambient sensing ML model based on interactions with the automated assistant.

3 Claims, 8 Drawing Sheets

(56) References Cited

U.S. PATENT DOCUMENTS

2018/0260680 A1    9/2018   Finkelstein et al.
2022/0245520 A1*   8/2022   Wantland ............... G06F 40/30

OTHER PUBLICATIONS

Intellectual Property India; Examination Report issued in Application No. 202227070163; 6 pages; dated Mar. 18, 2025.
European Patent Office; Communication pursuant to Article 94(3) EPC issued in Application No. 21827336.5, 6 pages, dated Aug. 13, 2025.
Intellectual Property India; Hearing Notice issued in Application No. 202227070163; 3 pages; dated Oct. 7, 2025.

* cited by examiner

INFERRING ASSISTANT ACTION(S) BASED ON AMBIENT SENSING BY ASSISTANT DEVICE(S)

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a text conversion thereof), and optionally data indicative of the user's identity (e.g., credentials). The cloud-based counterpart may perform various processing on the explicit input to return result(s) to the automated assistant client, which may then provide corresponding output to the user. In other cases, automated assistants may be exclusively executed locally by assistant devices and that are engaged directly by users to reduce latency.

Many users may engage automated assistants in performing routine day-to-day tasks via assistant actions. For example, a user may routinely provide one or more explicit user inputs that cause an automated assistant to check the weather, check for traffic along a route to work, start a vehicle, and/or other explicit user input that causes the automated assistant to perform other assistant actions while the user is eating breakfast. As another example, a user may routinely provide one or more explicit user inputs that causes an automated assistant to play a particular playlist, track a workout, and/or other explicit user input that cause an automated assistant to perform other assistant actions in preparation for the user to go on a run. However, if the automated assistant is able to infer an ambient state of the user (e.g., about to go on a run) and/or an environment of the user (e.g., kitchen), then the automated assistant can proactively suggest one or more of these assistant actions be performed, thereby reducing some explicit user inputs directed to the automated assistant and shortening a duration of an interaction with the automated assistant. Additionally, or alternatively, one or more of these assistant actions can be automatically performed, thereby eliminating some explicit user inputs directed to the automated assistant and shortening a duration of an interaction with the automated assistant.

SUMMARY

Implementations described herein relate to generating one or more suggested actions (e.g., a routine) that are suggested be performed, on behalf of a user, by an automated assistant. The automated assistant can process, using an ambient sensing machine learning (ML) model, an instance of sensor data to generate one or more of the suggested actions. The instance of the sensor data can be obtained from one or more assistant devices in an environment of the user (e.g., obtained from sensor(s) of the assistant device(s)). In some implementations, an ambient state can be determined based on processing the instance of the sensor data, and the ambient sensing ML model can process the ambient state to generate one or more of the suggested actions. In additional or alternative implementations, the ambient sensing ML model can process the instance of the sensor data directly to generate one or more of the suggested actions. In various implementations, each of the one or more suggested actions generated using the ambient sensing ML model can be associated with a corresponding predicted measure. In some versions of those implementations, such as when the corresponding predicted measure associated with one or more of the suggested actions satisfies a first threshold measure but not a second threshold measure, the automated assistant can cause a corresponding representation of one or more of the suggested actions can be provided for presentation to the user (e.g., visually and/or audibly). In additional or alternative versions of those implementations, such as when the corresponding predicted measure associated with one or more of the suggested actions satisfies the first threshold measure and the second threshold measure, the automated assistant can cause one or more of the suggested actions to be automatically performed on behalf of the user.

For example, assume a given assistant device is an interactive standalone speaker device having a display and located in a primary dwelling of a user. Further assume that the user makes and/or eats breakfast in a kitchen of the primary dwelling every weekday morning (e.g., determined based on at least ambient audio data capturing sounds of the user making and eating breakfast). Further assume that, as the user makes and eats breakfast in the kitchen, the user typically invokes an automated assistant, via the given assistant device, and asks the automated assistant to provide a weather update for a current location of the user and a traffic update for a commute to work. Accordingly, when the user is subsequently making and/or eating breakfast in the kitchen of the primary dwelling (e.g., determined based on at least subsequent ambient audio data capturing sounds of the user making and eating breakfast), the automated assistant can proactively suggest the weather update and/or the traffic update to the user and/or automatically provide the weather update and/or the traffic update (e.g., a breakfast routine) without the automated assistant ever being explicitly invoked by the user.

In some implementations, the ambient sensing ML model can be trained based on a plurality of training instances. Each of the training instances can include training instance input and training instance output. The training instance input can include, for example, an instance of sensor data and/or an ambient state determined based on the instance of sensor data. As described herein, the sensor data can include any data generated by one or more assistant devices in an environment of a user that corresponds to an ambient sensing event. For example, the instance of the sensor data can include audio data that captures ambient noises or sounds, motion data that captures ambient motion of the user, pairing data that captures pairing of multiple assistant devices in the environment, device state data that captures a state (or change of state) of one or more of the assistant devices, temporal data, and/or other data generated by one or more of the assistant devices. As described herein, the ambient state determined based on the instance of the sensor data can be one or more of a plurality of disparate ambient states (e.g., classes, categories, etc.) that may be defined with varying degrees of granularity. For instance, and with reference to the above example, the determined ambient state may be a breakfast ambient state or a more general cooking ambient state that is determined based on the instance of sensor data including ambient audio data that captures cooking sounds (e.g., food sizzling, appliances dinging, etc.) and/or a user eating (e.g., cutlery clinking, chewing sounds, etc.). Further, the training instance output can include, for example, an indication of one or more user-initiated temporally corresponding actions via one or more of the assistant devices that temporally correspond to the instance of the sensor data and/or the ambient state. For instance, and with reference to the above example, the indication of the one or more temporally corresponding actions can include an indication of a weather update action, a traffic update action, and/or an indication of any other user-initiated action performed while in the breakfast or cooking ambient state.

As noted above, in some implementations, the training instance input can include an ambient state. In these implementations, the instance of the sensor data may be processed, using a classifier or ambient ML model (e.g., that is distinct from the ambient sensing ML model described herein), to determine the ambient state of the training instance input. For example, the instance of the sensor data can be processed to generate an embedding (e.g., a lower dimensional representation) and the embedding can be compared, in embedding space, to a plurality of disparate embeddings assigned to respective ambient states. The ambient state can be determined based on a distance, in the embedding space, between the generated embedding and the plurality of disparate embeddings assigned to the respective ambient states. For instance, and with respect to the above example, an audio embedding generated based on processing the cooking sounds may be closer, in the embedding space, to a first embedding associated with a cooking ambient state than to a second embedding associated with a workout ambient state. As a result, it can be determined that the ambient state corresponds to the cooking ambient state. The ambient state can be subsequently processed, using the ambient sensing ML model, to predict one or more actions given the ambient state (optionally using the embedding space or an additional embedding space). Further, the one or more predicted actions (and/or corresponding predicted measures associated therewith) can be compared to the indication of the one or more temporally corresponding actions (and/or ground truth measures associated therewith) to generate one or more losses, and the ambient sensing ML model can be updated based on one or more of the losses. In additional or alternative implementations, the instance of the sensor data may be processed directly using the ambient sensing ML model. In these implementations, the embeddings generated can be directly mapped to the indication of the one or more predicted actions in the embedding space. In other words, the ambient state may be an intermediate output generated using the ambient sensing ML model, and the one or more predicted actions can be generated in the same or similar manner, but based on the intermediate output (e.g., the actual embedding generated based on the instance of the sensor data and/or a semantic representation of the embedding (e.g., cooking ambient state in the above example)). Notably, in various implementations, the techniques described herein can be performed entirely locally at one or more assistant devices, such that sensor data, ambient states of users, indications of temporally corresponding actions, indications of suggested actions, and/or any other data described herein does not leave the assistant devices.

As noted above, and subsequent to training of the ambient sensing ML model, instances of sensor data can be processed to generate one or more suggested actions (e.g., a routine) that are suggested for performance by the automated assistant and on behalf of the user. In some implementations, a corresponding representation of one or more of the suggested actions can be provided for presentation to the user. The corresponding representation of one or more of the suggested actions can be provided for presentation to the user, for example, in response to determining a corresponding predicted measure associated with one or more of the suggested actions satisfies a first threshold measure, but fails to satisfy a second threshold measure. In other words, the corresponding representation of one or more of the suggested actions can be provided for presentation to the user if the automated assistant thinks the user will perform the action, but is not highly confident the user will perform the action. Further, the corresponding representation of one or more of the suggested actions can be provided for presentation to the user as audible output and/or visual output. For example, the automated assistant can generate and output synthesized speech (e.g., via speaker(s) of one or more assistant devices) that includes an indication of one or more of the suggested actions, and the user can provide spoken input responsive to the synthesized speech that causes the automated assistant to perform one or more of the suggested actions. As another example, the automated assistant can generate and output visual content (e.g., via display(s) of one or more assistant devices) that includes an indication of one or more of the suggested actions, and the user can provide a user selection of one or more of the suggested actions responsive to the visual content being rendered that causes the automated assistant to perform one or more of the suggested actions. In additional or alternative implementations, one or more of the suggested actions (e.g., some or all) can be automatically performed by the automated assistant. One or more of the suggested actions can be automatically performed, for example, in response to determining a corresponding predicted measure associated with one or more of the suggested actions satisfy both a first threshold measure and a second threshold measure.

In various implementations, user input received responsive to the corresponding representation of one or more of the suggested actions and/or responsive to one or more of the suggested actions being automatically performed can be utilized as a feedback signal for updating the ambient sensing ML model. For example, if a user causes the one or more suggested actions to be performed, the one or more suggested actions generated using the ambient sensing ML model can be biased towards those actions when the same ambient state is subsequently determined. As another example, if a user causes the one or more suggested actions to be performed, the ambient sensing ML model can be further trained to reinforce generating an indication of the one or more suggested actions. However, if the user did not select a given action (or caused the automated assistant to undo a given action), when subsequent instances of sensor data are obtained that are indicative of the ambient state, the one or more suggested actions generated using the ambient sensing ML model can be biased away from the given action. In this manner, the ambient sensing ML model can generate suggested actions that are most likely to be initiated by the user based on a current ambient state.

By using the techniques described herein, various technical advantages can be achieved. As one non-limiting example, in implementations where the one or more suggested actions that are provided for presentation to a user, explicit user inputs can be simplified (e.g., single-click, single-touch, "Yes" or "No" to perform one or more of the suggested actions rather than a full spoken utterance, etc.) to cause performance of one or more of the suggested actions. Further, in implementations where one or more of the suggested actions are automatically performed on behalf of the user, explicit user inputs to perform one or more of the suggested actions may be eliminated altogether. Moreover, in training the ambient sensing ML model to generate one or more of the suggested actions based on ambient states and temporally corresponding actions for a user, the ambient sensing ML model can more robustly and/or accurately generate one or more of the suggested actions that are best suited for the user given the ambient state. As a result, a quantity and/or duration of user inputs that are received by one or more assistant devices can be reduced because the user need not provide free-form input to cause one or more of the suggested actions to be performed, thereby conserving computational resources at one or more of the assistant devices and/or network resources by reducing network traffic.

The above description is provided as an overview of only some implementations of the present disclosure. Further description of those implementations, and other implementations, are described in more detail herein. As one non-limiting example, various implementations are described in more detail in the claims included herein.

DETAILED DESCRIPTION

Figure 1:
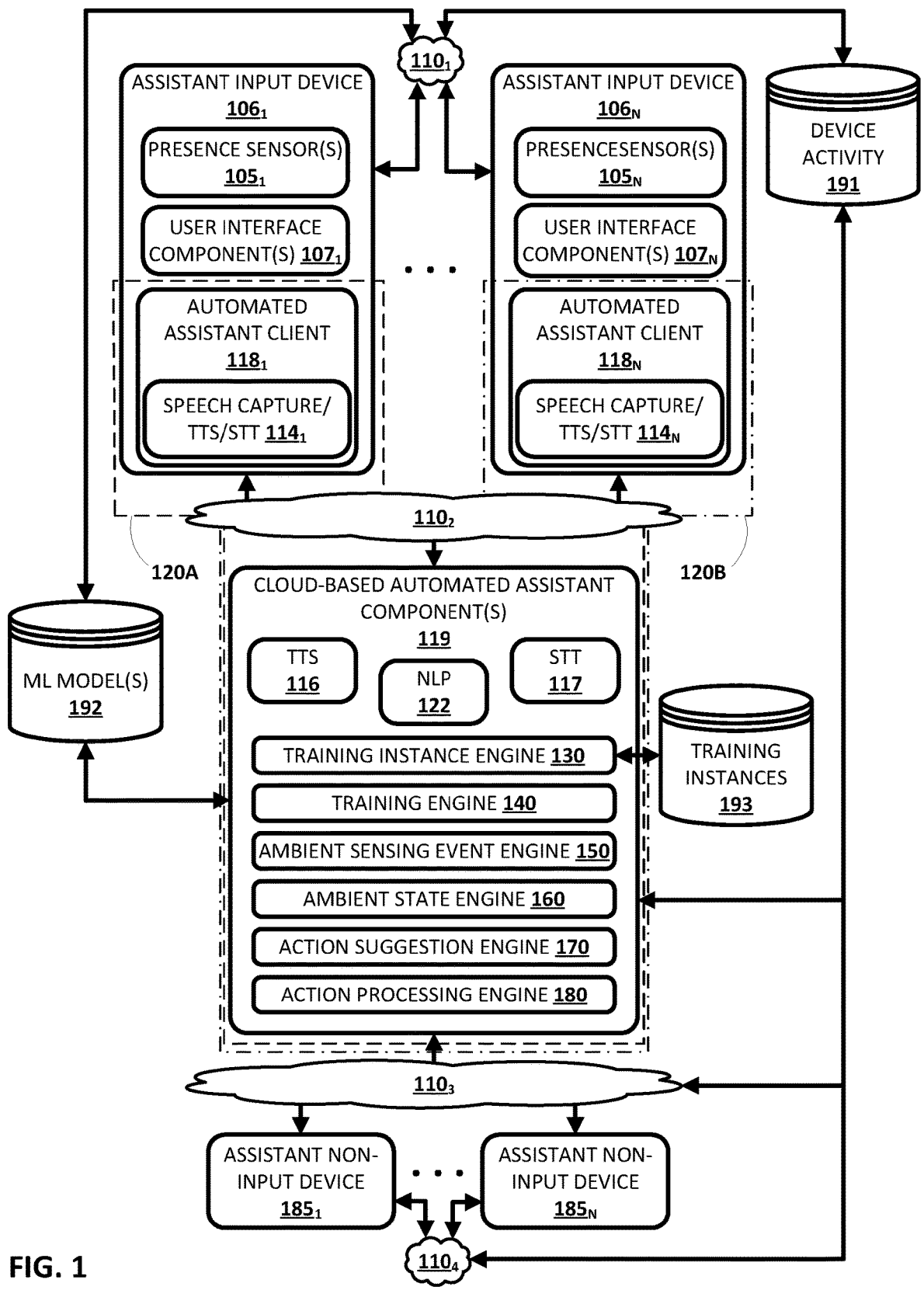
FIG. 1 is a block diagram of an example environment in which implementations disclosed herein may be implemented.

There is a proliferation of smart, multi-sensing network connected devices (also referred to herein as assistant devices) such smart phones, tablet computers, vehicle computing systems, wearable computing devices, smart televisions, interactive standalone speakers (e.g., with or without a display), sound speakers, home alarms, door locks, cameras, lighting systems, treadmills, thermostats, weight scales, smart beds, irrigation systems, garage door openers, appliances, baby monitors, fire alarms, moisture detectors, etc. Often, multiple assistant devices are located within the confines of a structure, such as a home—or located within multiple related structures, such as a user's primary residence and the user's secondary residence, the user's vehicle, and/or the user's work location.

Further, there is a proliferation of assistant devices that each include an automated assistant client that can form a logical instance of an automated assistant (also referred to herein as assistant input devices). These assistant input devices can be devoted solely to assistant functionality (e.g., an interactive standalone speaker and/or standalone audio/visual device including only an assistant client and associated interface, and devoted solely to assistant functionality) or can perform assistant functionality in addition to other functions (e.g., a mobile phone or tablet that includes an assistant client as one of multiple applications). Moreover, some IoT devices can also be assistant input devices. For example, some IoT devices can include an automated assistant client and at least speaker(s) and/or microphone(s) that serve (at least in part) as user interface output and/or input devices for an assistant interface of the automated assistant client. Although some assistant devices may not implement the automated assistant client or have means for interfacing with a user (e.g., speaker(s) and/or microphone(s)), they may still be controlled by the automated assistant (also referred to herein as assistant non-input devices). For example, a smart light bulb may not include an automated assistant client, speaker(s), and/or microphone(s), but commands and/or requests can be transmitted to the smart light bulb, via the automated assistant, to control functionality of the smart light (e.g., turn on/off, dim, change colors, etc.).

Implementations described herein relate to generating one or more suggested actions to be performed by an automated assistant, on behalf of a user, via one or more assistant devices of the user (e.g., assistant input device(s) and/or assistant non-input device(s)). The one or more suggested actions can be generated based on processing, using an ambient sensing machine learning (ML) model, an ambient state that reflects an ambient state of the user and/or an ambient state of an environment of the user. The ambient state can be determined based on at least an instance of sensor data obtained via sensor(s) of one or more of the assistant devices.

The sensor data can include any data generated by an assistant input device of the user and/or an assistant non-input device of the user. For example, the sensor data can include audio data generated by microphone(s) that captures a spoken utterance of a user, ambient noise in the environment of the user, and/or any other audio data; motion or location data generated by GPS sensor(s) and/or accelerometers that captures movement information of the user (e.g., a user walking, jogging, walking, riding a bike, and/or other modes of transportation); pairing data associated with one or more devices that detects a connection being established or removed between multiple assistant input devices and/or assistant non-input devices over one or more networks (e.g., a mobile device pairing with headphones, a mobile device pairing with a home Wi-Fi network, etc.); vision data generated by vision component(s) in the environment of the user (e.g., camera(s), RADAR sensor(s), LIDAR sensor(s), and/or any other vision components); device state data of one or more assistant input devices and/or assistant non-input devices (e.g., a state of a smart lock, a state of smart lights, a state of a smart appliance, etc.); and/or any other data generated by an assistant input device and/or an assistant non-input device of the user (e.g., such as other data generated by other presence sensors described herein). Moreover, an instance of the sensor data can include any combination of the aforementioned sensor data. Notably, the instance of the sensor data is not limited to sensor data corresponding to a particular instance of time. For example, the instance of the sensor data can include audio data that captures a spoken utterance of a user and/or ambient noise in the environment of the user over multiple instances of time, motion data that captures movement information of the user over multiple instances of time, and/or application state data and/or device state date over multiple instances of time. Further, the instance of the sensor data can include data generated by multiple assistant input devices and/or assistant non-input devices.

The ambient state can be one of a plurality of disparate ambient states (e.g., classes, categories, etc.) that may be defined with varying degrees of granularity. For example, an ambient state may be a general cooking ambient state, or, more particularly, a breakfast ambient state, a lunch ambient state, a dinner ambient state, a snack ambient state, and/or other ambient states associated with the general cooking ambient state; a general workout ambient state, or, more particularly, a weight lifting ambient state, a running ambient state, a jogging ambient state, a walking ambient state, and/or other ambient states associated with the general workout ambient state; a general media consumption ambient state, or, more particularly, a television ambient state, a music ambient state, a podcast ambient state, a news ambient state, and/or other ambient states associated with the general media consumption ambient state; a general communications ambient state, or, more particularly, a conversation ambient state (e.g., in-person conversation, phone conversation, etc.), a messaging ambient state (e.g., electronic mail, text messages, social media messages, etc.), and/or other ambient states associated with the general conversation ambient state; a general house maintenance ambient state, or, more particularly, a lawn care ambient state, a laundry ambient state, a cleaning ambient state, and/or other ambient states associated with the general house maintenance ambient state; a general away ambient state, or, more particularly, an at work ambient state, a vacation ambient state, and/or or other ambient states associated with the general away ambient state; and/or other ambient states defined with varying degrees of granularity. Although particular ambient states are enumerated above, it should be understood those are provided for the sake of example and are not meant to be limiting.

As noted above, the ambient state can be determined based on at least the instance of the sensor data. In some implementations, such as when the instance of the sensor data includes audio data or motion data, the instance of the sensor data can be processed to determine the ambient state. For example, in implementations where the instance of the sensor data includes audio data and/or motion data, the audio data and/or motion data can be processed, using a classifier or other ambient ML model(s), to determine the ambient state. For instance, assume a user is located at his or her primary dwelling, and assume that a given assistant device co-located in the primary dwelling of the user generates audio data (e.g., via microphone(s)) that captures ambient noise during the morning hours. Further assume the audio data is processed, using a classifier (or an ambient noise detection ML model), to generate output indicating the audio data captures ambient noise of food sizzling, an appliance dinging or buzzing, and/or cutlery clinking on a dish. In this example, the determined ambient state may correspond to a cooking ambient state, or, more particularly, a breakfast ambient state. Also, for instance, assume a user is located immediately outside his or her primary dwelling, and motion data is generated via GPS sensors and/or accelerometers of the mobile phone. Further assume the motion data is processed, using a classifier (or an ambient motion detection ML model), to generate output indicating the motion data captures the user walking. In this example, the determined ambient state may correspond to a workout ambient state, or, more particularly, a walking state. Also, in this example, the ambient state may correspond to an away ambient state since the user is no longer in the primary dwelling. In additional or alternative implementations, such as when the instance of the sensor data includes pairing data and/or device state data, the ambient state can be determined based on the instance of the sensor data and without processing the instance of the sensor data. For instance, assume a mobile device of a user is paired with one or more headphones (e.g., Bluetooth headphones). In this example, the determined ambient state may correspond to a media consumption ambient state and/or a conversation ambient state.

Although the above examples provided above are described with respect to determining the ambient state based on discrete portions of the instance of the sensor data (e.g., audio data, motion data, pairing data, or device data), it should be understood that is for the sake of example and is not meant to be limiting. For example, each of the aspects of the instance of the sensor data can be utilized in combination to determine the ambient state. For instance, again assume the user is located immediately outside his or her primary dwelling, and motion data is generated via GPS sensors and/or accelerometers of the mobile phone. Further assume the motion data is processed, using a classifier (or an ambient motion detection ML model), to generate output indicating the motion data captures the user walking. In this example, the determined ambient state may correspond to a workout ambient state, or, more particularly, a walking state as described above. However, further assume that the mobile device of the user generates audio data (e.g., via microphone (s)) that captures ambient noise while the user is walking. Further assume the audio data is processed, using a classifier (or an ambient noise detection ML model), to generate output indicating the audio data captures ambient noise of a lawn mower. Accordingly, based on the combination of the noise of the lawn mower in combination with the user walking, the determined ambient state may correspond to house maintenance ambient state, or more particularly, a lawn care ambient state.

Turning now to FIG. 1, an example environment in which techniques disclosed herein may be implemented is illustrated. The example environment includes a plurality of assistant input devices $106_{1-N}$ (also referred to herein simply as "assistant input devices 106"), one or more cloud-based automated assistant components 119, one or more assistant non-input devices $185_{1-N}$ (also referred to herein simply as "assistant non-input devices 185"), a device activity database 191, a ML model(s) database 192, and a training instances database 193. The assistant input devices 106 and the assistant non-input device 185 of FIG. 1 may also be referred to collectively herein as "assistant devices".

One or more (e.g., all) of the assistant input devices 106 can execute a respective instance of a respective automated assistant client $118_{1-N}$. However, in some implementations one or more of the assistant input devices 106 can optionally lack an instance of the respective automated assistant client $118_{1-N}$, and still include engine(s) and hardware components for receiving and processing user input directed to an automated assistant (e.g., microphone(s), speaker(s), speech recognition engine(s), natural language processing engine(s), speech synthesis engine(s), and so on). An instance of the automated assistant client $118_{1-N}$ can be an application that is separate from an operating system of the respective assistant input devices 106 (e.g., installed "on top" of the operating system)—or can alternatively be implemented directly by the operating system of the respective assistant input devices 106. As described further below, each instance of the automated assistant client $118_{1-N}$ can optionally interact with one or more cloud-based automated assistant components 119 in responding to various requests provided by respective user interface components $107_{1-N}$ of any one of the respective assistant input devices 106. Further, and as also described below, other engine(s) of the assistant input devices 106 can optionally interact with one or more of the cloud-based automated assistant components 119.

One or more the cloud-based automated assistant components 119 can be implemented on one or more computing systems (e.g., server(s) collectively referred to as a "cloud" or a "remote" computing system) that are communicatively coupled to respective assistant input devices 106 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 119 with the assistant input devices 106 is indicated generally by $110_1$ of FIG. 1. Also, in some implementations, the assistant input devices 106 may be communicatively coupled with each other via one or more networks (e.g., LANs and/or WANs), indicated generally by $110_2$ of FIG. 1.

The one or more cloud-based automated assistant components 119 can also be communicatively coupled with the assistant non-input devices 185 via one or more networks (e.g., LANs, WANs, and/or other networks). The communicative coupling of the cloud-based automated assistant components 119 with the assistant non-input system(s) 180 is indicated generally by $110_3$ of FIG. 1. In some implementations, one or more corresponding assistant non-input systems (not depicted for the sake of clarity) can be communicatively coupled to one or more (e.g., groups) of the assistant non-input devices 185 via one or more networks (e.g., LANs, WANs, and/or other network(s)). For example, a first assistant non-input system can be communicatively coupled with, and receive data from, a first group of one or more of the assistant non-input devices 185, a second assistant non-input system can be communicatively coupled with, and receive data from, a second group of one or more of the assistant non-input devices 185, and so on. Also, in some implementations, one or more (e.g., groups or all) of the assistant non-input devices 185 may be communicatively coupled with each other via one or more networks (e.g., LANs, WANs, and/or other network(s)), indicated generally by $110_4$ of FIG. 1. The networks $110_{1-4}$ of FIG. 1 may also be referred to collectively herein as "network(s) 110".

An instance of an automated assistant client 118, by way of its interactions with one or more of the cloud-based automated assistant components 119, may form what appears to be, from a user's perspective, a logical instance of an automated assistant with which the user may engage in a human-to-computer dialog. Two instances of such an automated assistant are depicted in FIG. 1. A first automated assistant 120A encompassed by a dashed line includes automated assistant client $118_1$ of assistant input device $106_1$ and one or more cloud-based automated assistant components 119. A second automated assistant 120B encompassed by a dash-dash-dot line includes automated assistant client $118_N$ of assistant input device $106_N$ and one or more cloud-based automated assistant components 119. The first automated assistant 120A and the second automated assistant of FIG. 1 may also be referred to herein simply as "the automated assistant 120". It thus should be understood that each user that engages with an automated assistant client 118 executing on one or more of the assistant input devices 106 may, in effect, engage with his or her own logical instance of an automated assistant (or a logical instance of automated assistant that is shared amongst a household or other group of users and/or shared amongst multiple automated assistant clients 118). Although only a plurality of assistant input devices 106 are illustrated in FIG. 1, it is understood that cloud-based automated assistant component(s) 119 can additionally serve many additional groups of assistant input devices. Moreover, although various engines of the cloud-based automated assistant components 119 are described herein as being implemented separate from the automated assistant clients 118 (e.g., at server(s)), it should be understood that it is for the sake of example and is not meant to be limiting. For instance, one or more (e.g., all) of the engines described with respect to the cloud-based automated assistant components 119 can be implemented locally by one or more of the assistant input devices 106.

The assistant input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant 120. Additional and/or alternative assistant input devices may be provided. The assistant non-input devices 185 may include many of the same devices as the assistant input devices 106, but are not capable of receiving user input directed to the automated assistant 120 (e.g., do not include user interface input component(s)). Although the assistant non-input devices 185 do not receive user input directed to the automated assistant 120, the assistant non-input devices 185 may still be controlled by the automated assistant 120.

In some implementations, the plurality of assistant input devices 106 and assistant non-input devices 185 can be associated with each other in various ways in order to facilitate performance of techniques described herein. For example, in some implementations, the plurality of assistant input devices 106 and assistant non-input devices 185 may be associated with each other by virtue of being communicatively coupled via one or more networks (e.g., via the network(s) 110 of FIG. 1). This may be the case, for instance, where the plurality of assistant input devices 106 and assistant non-input devices 185 are deployed across a particular area or environment, such as a home, a building, and so forth. Additionally, or alternatively, in some implementations, the plurality of assistant input devices 106 and assistant non-input devices 185 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of assistant input devices 106 and assistant non-input devices 185 can be manually and/or automatically associated with each other in a device topology representation of the ecosystem.

The assistant non-input devices 185 and the corresponding non-input systems can include one or more first-party (1P) devices and systems and/or one or more third-party (3P) devices and systems. A 1P device or system references a system that is controlled by a party that is the same as the party that controls the automated assistant 120 referenced herein. In contrast, a 3P device or system references a system that is controlled by a party that is distinct from the party that controls the automated assistant 120 referenced herein.

The assistant non-input devices 185 can selectively transmit data (e.g., state(s), state change(s), and/or other data) to the automated assistant 120 over the network(s) 110, and optionally via corresponding assistant non-input system(s). For example, assume assistant non-input device $185_1$ is a smart doorbell IoT device. In response to an individual pressing a button on the doorbell IoT device, the doorbell IoT device can transmit corresponding data directly to automated assistant 120 and/or to an assistant non-input system(s) managed by a manufacturer of the doorbell that may be a 1P system or 3P system. The automated assistant 120 (or the assistant non-input system) can determine a change in a state of the doorbell IoT device based on such data. For instance, the automated assistant 120 (or the assistant non-input system) can determine a change in the doorbell from an inactive state (e.g., no recent pressing of the button) to an active state (recent pressing of the button). Notably, although user input is received at the assistant non-input device $185_1$ (e.g., the pressing of the button on the doorbell), the user input is not directed to the automated assistant 120 (hence the term "assistant non-input device"). As another example, assume assistant non-input device $185_1$ is a smart thermostat IoT device that has microphone(s), but the smart thermostat does not include the automated assistant client 118. An individual can interact with the smart thermostat (e.g., using touch input or spoken input) to change a temperature, set particular values as setpoints for controlling an HVAC system via the smart thermostat, and so on. However, the individual cannot communicate directly with the automated assistant 120 via the smart thermostat, unless the smart thermostat includes the automated assistant client 118.

In various implementations, one or more of the assistant input devices 106 may include one or more respective presence sensors $105_{1-N}$ (also referred to herein simply as "presence sensors 105") that are configured to provide, with approval from corresponding user(s), signals indicative of detected presence, particularly human presence. In some of those implementations, the automated assistant 120 can identify one or more of the assistant input devices 106 to satisfy a spoken utterance from a user that is associated with the ecosystem based at least in part of presence of the user at or one or more of the assistant input devices 106. The spoken utterance can be satisfied by rendering responsive content (e.g., audibly and/or visually) at one or more of the assistant input devices 106, by causing one or more of the assistant input devices 106 and/or the assistant non-input devices 185 to be controlled based on the spoken utterance, and/or by causing one or more of the assistant input devices 106 and/or the assistant non-input devices 185 to perform any other action to satisfy the spoken utterance. As described herein, the automated assistant 120 can leverage data determined based on the respective presence sensors 105 in determining those assistant input devices 106 based on where a user is near or was recently near, and provide corresponding commands to only those assistant input devices 106. In some additional or alternative implementations, the automated assistant 120 can leverage data determined based on the respective presence sensors 105 in determining whether any user(s) (any users or specific users) are currently proximal to any of the assistant input devices 106, and can optionally suppress provision of commands if it is determined that no users (any users or specific users) are proximal to any of the assistant input devices 106.

The respective presence sensors 105 may come in various forms. Some assistant input devices 106 may be equipped with one or more digital cameras that are configured to capture and provide signal(s) indicative of movement detected in their fields of view. Additionally, or alternatively, some assistant input devices 106 may be equipped with other types of light-based presence sensors 105, such as passive infrared ("PIR") sensors that measure infrared ("IR") light radiating from objects within their fields of view. Additionally, or alternatively, some assistant input devices 106 may be equipped with presence sensors 105 that detect acoustic (or pressure) waves, such as one or more microphones. Moreover, in addition to the assistant input devices 106, one or more of the assistant non-input devices 185 can additionally or alternatively include respective presence sensors 105 described herein, and signals from such sensors can additionally be utilized by the automated assistant 120 in determining whether and/or how to satisfy spoken utterances according to implementations described herein.

Additionally, or alternatively, in some implementations, the presence sensors 105 may be configured to detect other phenomena associated with human presence or device presence in the ecosystem. For example, in some embodiments, a given one of the assistant devices 106, 185 may be equipped with a presence sensor 105 that detects various types of wireless signals (e.g., waves such as radio, ultrasonic, electromagnetic, etc.) emitted by, for instance, other assistant devices carried/operated by a particular user (e.g., a mobile device, a wearable computing device, etc.) and/or other assistant devices in the ecosystem. For example, some of the assistant devices 106, 185 may be configured to emit waves that are imperceptible to humans, such as ultrasonic waves or infrared waves, that may be detected by one or more of the assistant input devices 106 (e.g., via ultrasonic/infrared receivers such as ultrasonic-capable microphones).

Additionally, or alternatively, various assistant devices may emit other types of human-imperceptible waves, such as radio waves (e.g., Wi-Fi, Bluetooth, cellular, etc.) that may be detected by other assistant devices carried/operated by a particular user (e.g., a mobile device, a wearable computing device, etc.) and used to determine an operating user's particular location. In some implementations, GPS and/or Wi-Fi triangulation may be used to detect a person's location, e.g., based on GPS and/or Wi-Fi signals to/from the assistant device. In other implementations, other wireless signal characteristics, such as time-of-flight, signal strength, etc., may be used by various assistant devices, alone or collectively, to determine a particular person's location based on signals emitted by the other assistant devices carried/operated by the particular user.

Additionally, or alternatively, in some implementations, one or more of the assistant input devices 106 may perform voice recognition to recognize a user from their voice. For example, some instances of the automated assistant 120 may be configured to match a voice to a user's profile, e.g., for purposes of providing/restricting access to various resources. In some implementations, movement of the speaker may then be determined, e.g., by the presence sensors 105 of one or more of the assistant devices 106, 185 (and optionally GPS sensors and/or accelerometers). In some implementations, based on such detected movement, a location of the user may be predicted, and this location may be assumed to be the user's location when any content is caused to be rendered at one or more of the assistant devices 106, 185 based at least in part on proximity of those assistant device(s) to the user's location. In some implementations, the user may simply be assumed to be in the last location at which he or she engaged with the automated assistant 120, especially if not much time has passed since the last engagement.

Each of the assistant input devices 106 further includes respective user interface component(s) $107_{1-N}$ (also referred to herein simply as "user interface component(s) 107"), which can each include one or more user interface input devices (e.g., microphone, touchscreen, keyboard, and/or other input devices) and/or one or more user interface output devices (e.g., display, speaker, projector, and/or other output devices). As one example, user interface components $107_1$ of assistant input device $106_1$ can include only speaker(s) and microphone(s), whereas user interface components $107_N$ of assistant input device $106_N$ can include speaker(s), a touchscreen, and microphone(s). Additionally, or alternatively, in some implementations, the assistant non-input devices 185 may include one or more user interface input devices and/or one or more user interface output devices of the user interface component(s) 107, but the user input devices (if any) for the assistant non-input devices 185 may not allow the user to directly interact with the automated assistant 120.

Each of the assistant input devices 106 and/or any other computing device(s) operating one or more of the cloud-based automated assistant components 119 may include one or more memories for storage of data and software applications, one or more processors for accessing data and executing applications, and other components that facilitate communication over a network. The operations performed by one or more of the assistant input devices 106 and/or by the automated assistant 120 may be distributed across multiple computer systems. The automated assistant 120 may be implemented as, for example, computer programs running on one or more computers in one or more locations that are coupled to each other through a network (e.g., the network(s) 110 of FIG. 1).

As noted above, in various implementations, each of the assistant input devices 106 may operate a respective automated assistant client 118. In various embodiments, each automated assistant client 118 may include a respective speech capture/text-to-speech (TTS)/speech-to-text (STT) module $114_{1-N}$ (also referred to herein simply as "speech capture/TTS/STT module 114"). In other implementations, one or more aspects of the respective speech capture/TTS/STT module 114 may be implemented separately from the respective automated assistant client 118 (e.g., by one or more of the cloud-based automated assistant components 119).

Each respective speech capture/TTS/STT module 114 may be configured to perform one or more functions including, for example: capture a user's speech (speech capture, e.g., via respective microphone(s) (which in some cases may comprise one or more of the presence sensors 105)); convert that captured audio to text and/or to other representations or embeddings (STT) using speech recognition model(s) stored in the ML model(s) database 192; and/or convert text to speech (TTS) using speech synthesis model(s) stored in the ML model(s) database 192. Instance(s) of these model(s) may be stored locally at each of the respective assistant input devices 106 and/or accessible by the assistant input devices (e.g., over the network(s) 110 of FIG. 1). In some implementations, because one or more of the assistant input devices 106 may be relatively constrained in terms of computing resources (e.g., processor cycles, memory, battery, etc.), the respective speech capture/TTS/STT module 114 that is local to each of the assistant input devices 106 may be configured to convert a finite number of different spoken phrases to text (or to other forms, such as lower dimensionality embeddings) using the speech recognition model(s). Other speech input may be sent to one or more of the cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processing (NLP) module 122) using speech recognition model(s) stored in the ML model(s) database 192. Cloud-based TTS module 116 may be configured to leverage the virtually limitless resources of the cloud to convert textual data (e.g., text formulated by automated assistant 120) into computer-generated speech output using speech synthesis model(s) stored in the ML model(s) database 192. In some implementations, the cloud-based TTS module 116 may provide the computer-generated speech output to one or more of the assistant devices 106, 185 to be output directly, e.g., using respective speaker(s) of the respective assistant devices. In other implementations, textual data (e.g., a client device notification included in a command) generated by the automated assistant 120 using the cloud-based TTS module 116 may be provided to speech capture/TTS/STT module 114 of the respective assistant devices, which may then locally convert the textual data into computer-generated speech using the speech synthesis model(s), and cause the computer-generated speech to be rendered via local speaker(s) of the respective assistant devices.

The NLP module 122 processes natural language input generated by users via the assistant input devices 106 and may generate annotated output for use by one or more other components of the automated assistant 120, the assistant input devices 106, and/or the assistant non-input devices 185. For example, the NLP module 122 may process natural language free-form input that is generated by a user via one or more respective user interface input devices of the assistant input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

In various implementations, the one or more cloud-based automated assistant components 119 may further include various engines. For example, as shown in FIG. 1, the one or more cloud-based automated assistant components 119 may further include a training instance engine 120, a training engine 130, an ambient sensing event engine 150, an action suggestion engine 170, and an action processing engine 180. Although these various engines are depicted as the one or more cloud-based automated assistant components 119 in FIG. 1, it should be understood that is for the sake of example and is not meant to be limiting. For example, the assistant input devices 106 may include one or more of these various engines. As another example, these various engines can be distributed across the assistant input devices 106 and/or the one or more cloud-based automated assistant components 119.

Figure 2:
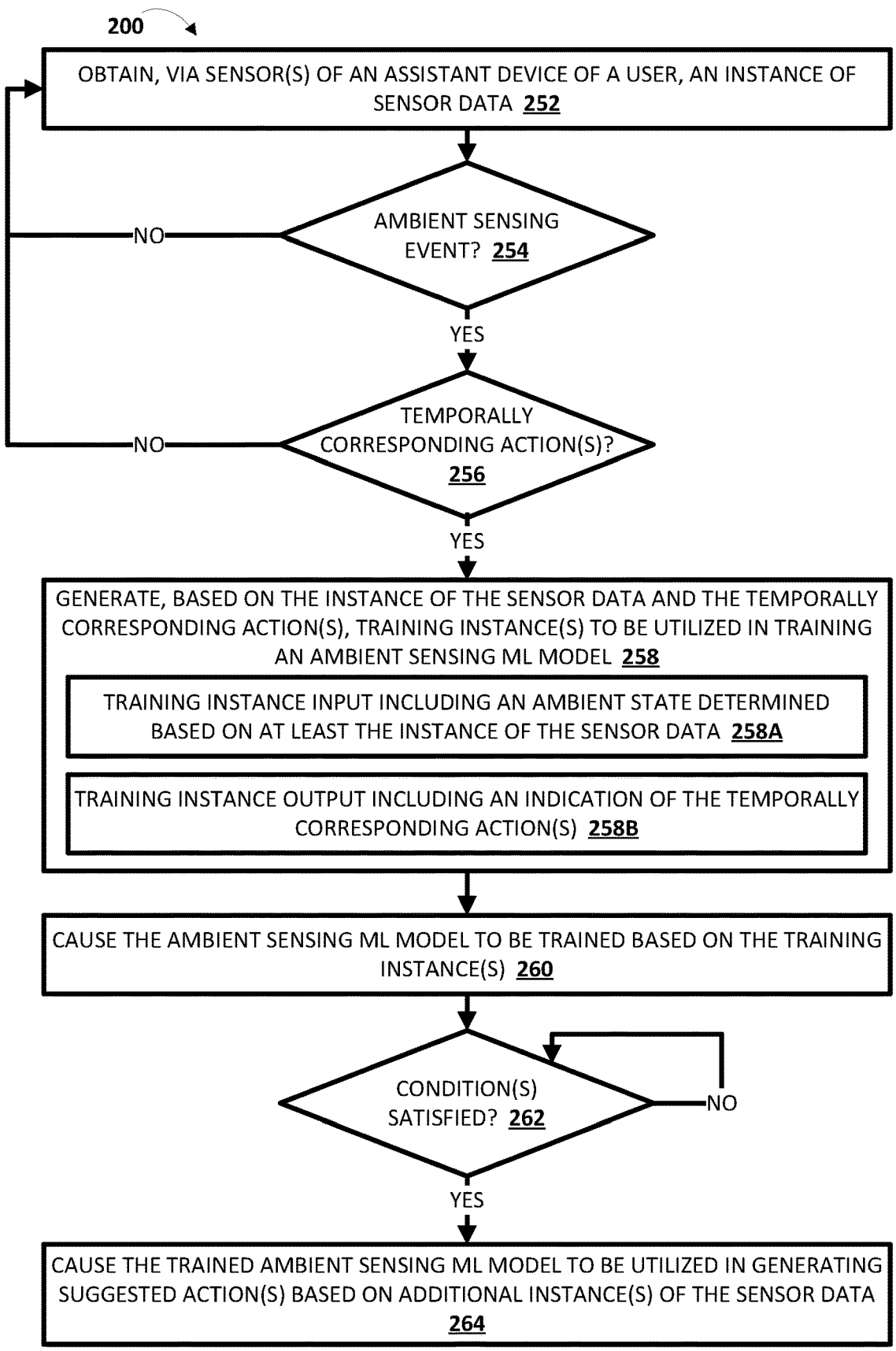
FIG. 2 is a flowchart illustrating an example method of generating a plurality of training instances for training an ambient sensing machine learning model and training the ambient sensing machine learning model, in accordance with various implementations.
Figure 3A:
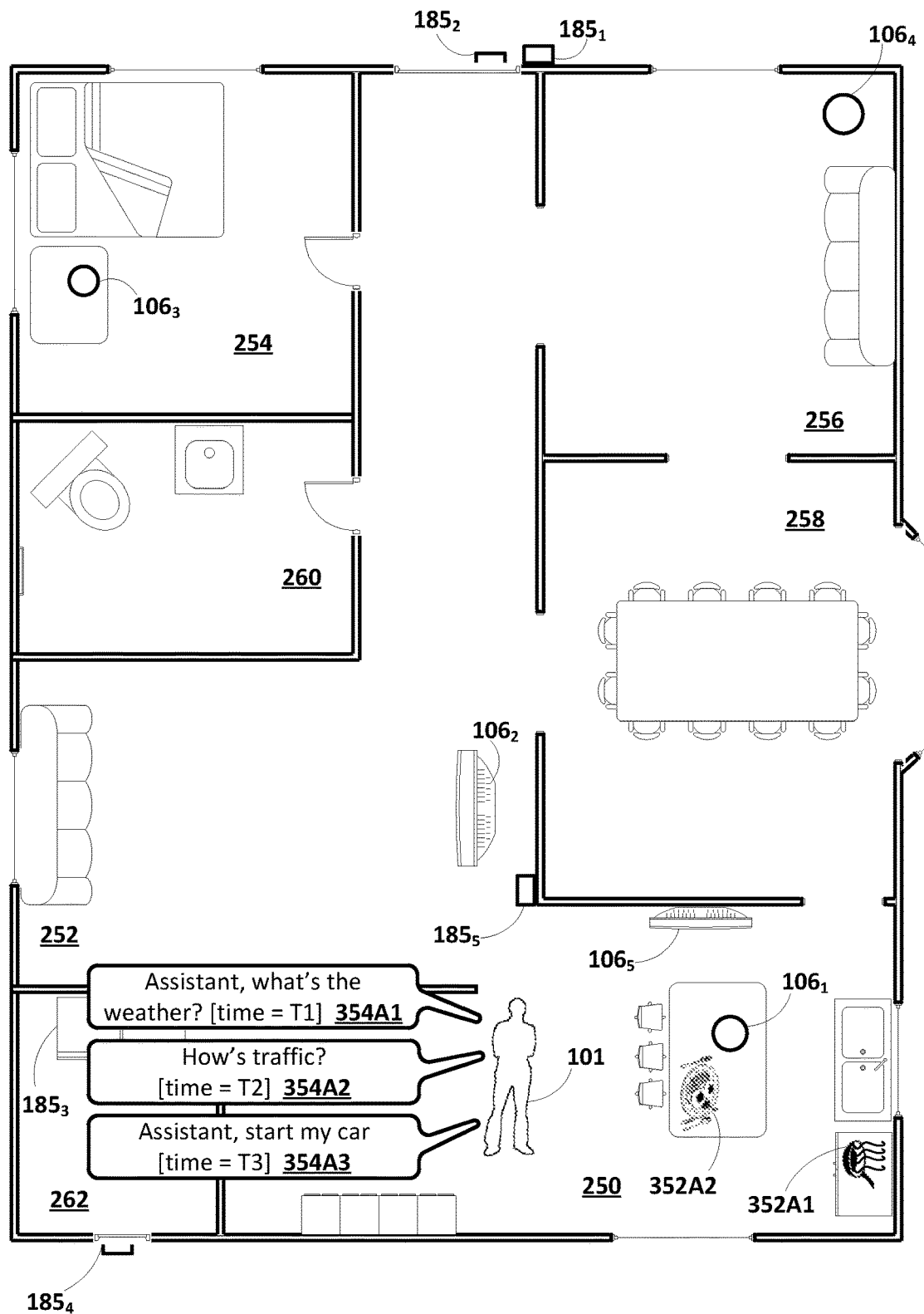
FIGS. 3A and 3B depict various non-limiting examples of interactions with an automated assistant that can be utilized in generating a plurality of training instances for training an ambient sensing machine learning model, in accordance with various implementations.
Figure 3B:
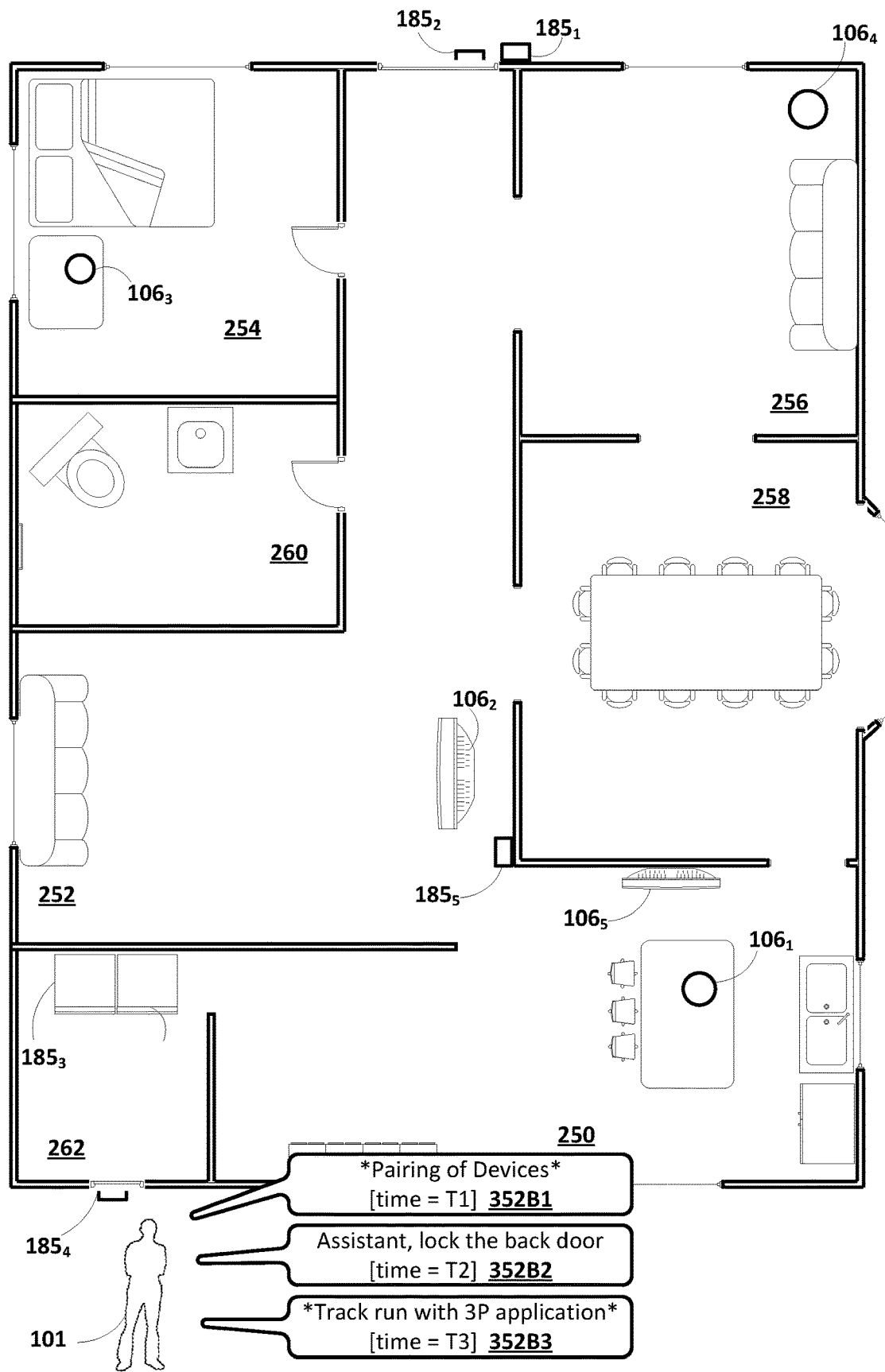

In some implementations, the training instance engine 130 can generate one or more training instances that are utilized to train an ambient sensing ML model (e.g., described with respect to FIGS. 2, 3A, and 3B). Each of the training instances can include training instance input and training instance output. The training instance output can include, for example, an ambient state that is determined based on an instance of sensor data and/or temporal data. The training instance output can include, for example, an indication of one or more temporally corresponding actions that temporally correspond to the ambient state. The one or more temporally corresponding actions can be user-initiated actions performed by a user via one or more of the assistant devices 106, 185 (e.g., described with respect to FIGS. 3A and 3B). Further, the one or more temporally corresponding actions can be considered to temporally correspond to the ambient state if they are detected within a threshold duration of time of the instance of the sensor data being captured by one or more of the assistant devices. In various implementations, one or more of the training instances can be stored in one or more databases (e.g., the training instance(s) database 193). In additional or alternative implementations, the training instance engine 130 can obtain one or more training instances (e.g., the training instance input and/or the training instance output) from one or more sources (e.g., a 1P source and/or 3P source), such as ambient state determined based on an instance of sensor data from one or more application programming interfaces (APIs) that can be utilized as training instance input for a given training instance. As described herein, the ambient sensing ML model described herein is trained (based on one or more of the training instances) to generate one or more suggested actions that are suggested for performance, on behalf of a user, by the automated assistant 120 via one or more of the assistant devices 106, 185.

In some implementations, the training instance engine 130 may only generate one or more of the training instances based on a given instance of the sensor data if the given instance of the sensor data corresponds to an ambient sensing event. For example, the automated assistant 120 can cause the ambient sensing event engine 150 to process the given instance of the sensor data to determine whether it does, in fact, correspond to an ambient sensing event. The ambient sensing event engine 150 can determine the given instance of the sensor data corresponds to an ambient sensing event based on, for example, the given instance of the sensor data including audio data that captures a particular noise and/or noise above a threshold noise level (e.g., captured via one or more of the presence sensors 105 described above), motion data that captures movement information for a particular duration of time and/or indicates a given assistant device (e.g., mobile phone) is being held, and optionally being held at a particular angle (e.g., captured via one or more of the presence sensors 105 described above), pairing data that captures pairing information for one or more particular assistant devices 106, 185 (e.g., Bluetooth headphones and a mobile device, a mobile device and a particular one of the assistant input devices (e.g., an in-vehicle assistant device)) over the network(s) 110, device state data that detects a state change in one or more of the assistant devices 106, 185 and/or some other device event (e.g., a particular state being maintained for a particular amount of time), and/or temporal data. Although the training instance engine 130 may only generate one or more of the training instances if the given instance of the sensor data corresponds to an ambient sensing event, it should be noted that the given instance of the sensor data can include sensor data captured before, during, and/or after it is determined the given instance sensor data corresponds to the ambient sensing event. For example, sensor data can be stored in some short-term memory (e.g., a buffer or other short-term memory) for a threshold duration of time. If it is determined the given instance of the sensor data does, in fact, correspond to an ambient sensing event, the sensor data can be retrieved from the short-term memory and utilized in determining an ambient state.

In other words, the ambient sensing event engine 150 can prevent training instances from being generated based on happenstance ambient sensor data such that the resulting training instances do, in fact, correspond to ambient sensing events for which one or more suggested actions should be generated. For example, assume the instance of the sensor data includes audio data that is captured via microphones of a given assistant device located in a primary dwelling of a user. Further assume the audio data is processed using a classifier or other ambient ML model(s) stored in the ML model(s) database 192 that is trained to classify audio data into one or more disparate categories. Further assume that it is determined the audio data captures the sound of a lawn mower and weed whacker, but the noise caused by the lawn mower and weed whacker fail to satisfy a noise threshold. In this example, the noise caused by the lawn mower and weed whacker may be caused by a neighbor performing lawn care maintenance. Accordingly, the neighbor performing the lawn care maintenance should not be considered an ambient sensing event for the user or the environment of the user. As another example, assume the instance of the sensor data includes motion data that is captured via GPS sensor(s) and/or accelerometers of a mobile device of a user. Further assume that it is determined the motion data captures the user walking outside of a primary dwelling, but the walking is for a short duration of time and the user never paired any other devices with the mobile device. In this example, the walking may correspond to a user walking to a mailbox to retrieve mail. Accordingly, the user just walking to get the mail may not be considered an ambient sensing event for the user or the environment of the user.

In some implementations, the ambient state engine 160 can determine an ambient state based on an instance of sensor data (and optionally in response to the ambient sensing event engine 150 determining the instance of the sensor data does, in fact, correspond to an ambient sensing event). The ambient state can be utilized as training instance input for a given training instance. The ambient state can reflect an ambient state of a user or an environment of the user. The ambient state can be one of a plurality of disparate ambient states (e.g., classes, categories, etc.) that may be defined with varying degrees of granularity as described herein. In versions of those implementations, the ambient state engine 160 can determine the ambient state directly based on the instance of the sensor data. In additional or alternative implementations, the ambient state engine 160 can process the instance of the sensor data using various classifier(s) and/or ambient ML model(s) stored in the ML model(s) database to determine the ambient state.

For example, in implementations where the instance of the sensor data includes audio data, the ambient state engine 160 can utilize a classifier or ambient noise detection ML model (e.g., stored in the ML model(s) database 192) to process the audio data in determining the ambient state. The ambient noise detection ML model can be trained using, for example, supervised learning techniques. For example, a plurality of training instances can be obtained. Each of the training instances can include training instance input that includes audio data capturing ambient noise, and training instance output that includes an indication of whether the training instance input includes the particular sound(s) for which the ambient noise detection model(s) is being trained to detect. For instance, if the ambient noise detection model is being trained to detect kitchen noises, positive training instances that include the sound of food cooking, dishes clinking, etc. can be assigned a label (e.g., "Yes" or "Cooking") or value (e.g., "1") and negative training instances that do not include kitchen sounds can be assigned a different label (e.g., "No" or a label associated with another ambient state, such as "Lawn Care", "Workout", etc.) or value (e.g., "0"). As another example, in implementations where the instance of the sensor data includes motion data, the ambient state engine 160 can utilize classifier or ambient motion detection model (e.g., stored in the ML model(s) database 192) to process the motion data in determining the ambient state. The ambient motion detection model can be trained in the same or similar manner described with respect to the ambient noise detection model, but using training instances that each include training instance input corresponding to motion data and training instance output corresponding to different types of motion.

In some implementations, the ambient noise detection ML model can be utilized to generate an audio embedding (e.g., a lower-dimensional representation of the instances of the ambient noise, such as an embedding) based on the audio data (or acoustic features thereof, such as mel-Cepstral frequency coefficients, raw audio waveforms, and/or other acoustic features). These embeddings can be points within an embedding space where similar sounds (or acoustic features that capture the sounds) are associated with the same or similar portions of the embedding space. Further, these portions of the embedding space can be associated with one or more of the plurality of disparate ambient state, and a given one of the embeddings can be classified into a given one of the ambient states if a distance metric between the given one of the embeddings and one or more of the portions of the embedding space satisfy(ies) a distance threshold. For instance, instances of food cooking can be associated with a first portion of the embedding space that is associated with "food cooking" sounds, instances of dishes clinking can be associated with a second portion of the embedding space that is associated with a "dishes clinking" sounds, instances of a lawn mower rumbling can be associated with a third portion of the embedding space that is associated with a "lawn mower" sounds, and so on. In this example, the first portion of the embedding space corresponding to the "food cooking" sounds and the second portion of the embedding space corresponding to "dishes clinking" sounds may be relatively close in the embedding space since they are "kitchen noises". However, the third portion of the embedding space may be relatively further away in the embedding space since it corresponds to "lawn care" sounds. Similarly, the ambient motion detection model can be utilized to generate motion embeddings in the same embedding space or a different embedding space as the audio embeddings.

In some implementations, the training engine 140 can utilize one or more of the training instances to train the ambient sensing ML model (e.g., using supervised learning techniques). The ambient sensing ML model can be a neural network, for example, a convolutional model, long short-term memory (LSTM) model, transformer model, and/or any other model that can process ambient states and/or instances of sensor data to generate one or more suggested actions that are suggested for performance, on behalf of the user, by the automated assistant 120 via one or more of the assistant devices 106, 185. For example, for a given training instance, the training engine 140 can cause the ambient sensing ML model to process the training instance input. In processing the training instance input, the ambient sensing ML model can generate an indication of one or more predicted actions that the user will perform based on the determined ambient state. The indication of one or more predicted actions that the user will perform based on the determined ambient state can be compared to the indication of the one or more temporally corresponding actions included in the training instance output to generate one or more losses. Further, the ambient sensing ML model can be updated based on one or more of the losses. For example, if the indication of the one or more predicted actions differ from the indication of the one or more temporally corresponding actions, then one or more losses may be generated. For instance, if the one or more predicted actions include an indication of predicted actions of initiating playing a running playlist via a music application and tracking a run via a workout application, but the indication of the temporally corresponding actions indicate that the user only initiated playing of the running playlist via the music application and did not track the run via the workout application, then the one or more losses can be generated that indicates tracking the run should not have been predicted based on a given ambient state. However, if the indication of the one or more predicted actions are that same as indication of the one or more temporally corresponding actions, then the one or more losses may be zero or near zero (e.g., the indication of the temporally corresponding actions indicate the user both initiated playing of the running playlist and tracking of the run).

In some versions of those implementations, each of the one or more predicted actions can be associated with a corresponding predicted measure. The corresponding predicted measures can be, for example, a corresponding probability, log likelihood, binary value, and/or any other measure indicative of whether a given predicted action should be suggested for performance, on behalf of the user, by the automated assistant 120 via one or more of the assistant devices 106, 185. In these implementations, the one or more losses can additionally or alternatively be based on the predicted measures. For instance, if the one or more predicted actions include an indication of predicted actions of initiating playing a running playlist via a music application with a probability of 0.9, and tracking a run via a workout application with a probability of 0.6, but the indication of the temporally corresponding actions indicate that the user only initiated playing of the running playlist via the music application (e.g., associated with a ground truth measure or probability of 1.0), but did not track the run via the workout application (e.g., associated with a ground truth measure or probability of 0.0), then the one or more losses can be generated that indicates tracking the run should not have been predicted based on a given ambient state, and further based on differences between the predicted measures and ground truth measures.

In various implementations, the classifier or ambient ML model(s) that are utilized to process the audio data and/or the motion data included in the instance of the sensor data to determine the ambient can be combined with the ambient sensing ML model in an end-to-end manner. This enables the one or more suggested actions to be generated directly based on an instance of the sensor data. In these implementations, the embeddings generated to determine the ambient state can be directly mapped to an indication of the one or more suggested actions in the embedding space. For example, the ambient sensing ML model can be utilized to generate an audio embedding (e.g., a lower-dimensional representation of the instances of the ambient noise) based on the audio data (or acoustic features thereof, such as mel-Cepstral frequency coefficients, raw audio waveforms, and/or other acoustic features). These embeddings can be points within an embedding space where similar sounds (or acoustic features that capture the sounds) are associated with the same or similar portions of the embedding space. Further, these portions of the embedding space can be associated with one or more of the plurality of disparate ambient state, and a given one of the embeddings can be classified into a given one of the ambient states if a distance metric between the given one of the embeddings and one or more of the portions of the embedding space satisfy(ies) a distance threshold.

For instance, and as described above, instances of food cooking can be associated with a first portion of the embedding space that is associated with "food cooking" sounds, instances of dishes clinking can be associated with a second portion of the embedding space that is associated with a "dishes clinking" sounds, instances of a lawn mower rumbling can be associated with a third portion of the embedding space that is associated with a "lawn mower" sounds, and so on. However, in these implementations, the first portion of the embedding space that is associated with "food cooking" sounds and the second portion of the embedding space that is associated with a "dishes clinking" sounds can also be associated with an indication of one or more actions that the user may perform while cooking or eating (e.g., such as an indication of one or more temporally corresponding actions performed by the user for when the ambient state corresponds to a cooking or eating ambient state). Further, the third portion of the embedding space that is associated with a "lawn mower" sounds can be associated with an indication of one or more actions that the user may perform while mowing to lawn (e.g., such as an indication of one or more temporally corresponding actions performed by the user for when the ambient state corresponds to a lawn care ambient state). One or more losses can be generated based on the embeddings in the same or similar manner described above with respect to the ambient ML model. However, in updating the end-to-end model in these implementations based on one or more of the losses, the ambient ML model portion of the end-to-end model may be fixed such that only the ambient sensing ML model portion of the end-to-end model is updated.

Figure 4:
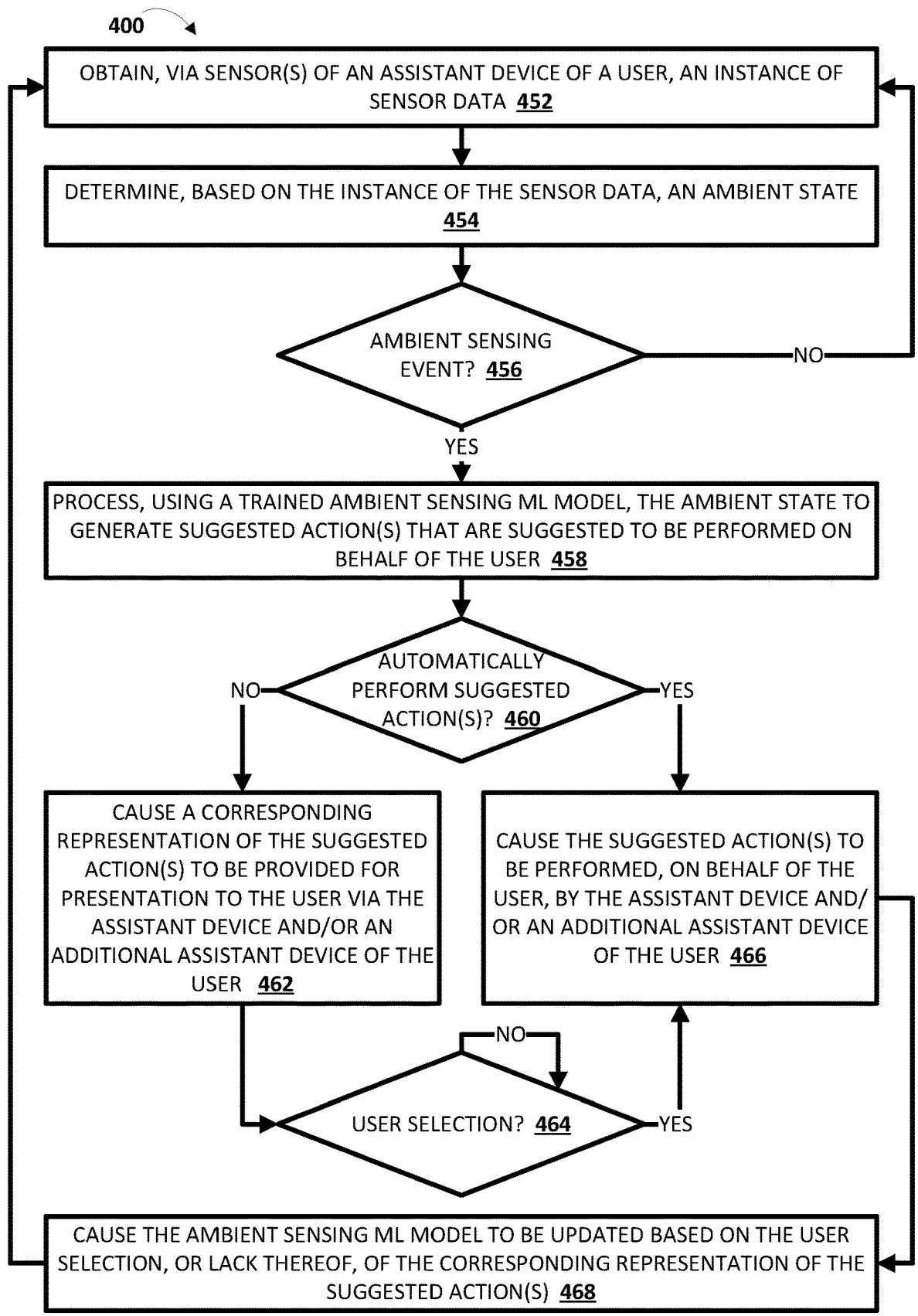
FIG. 4 is a flowchart illustrating an example method of using an ambient sensing machine learning model, in accordance with various implementations.
Figure 5A:
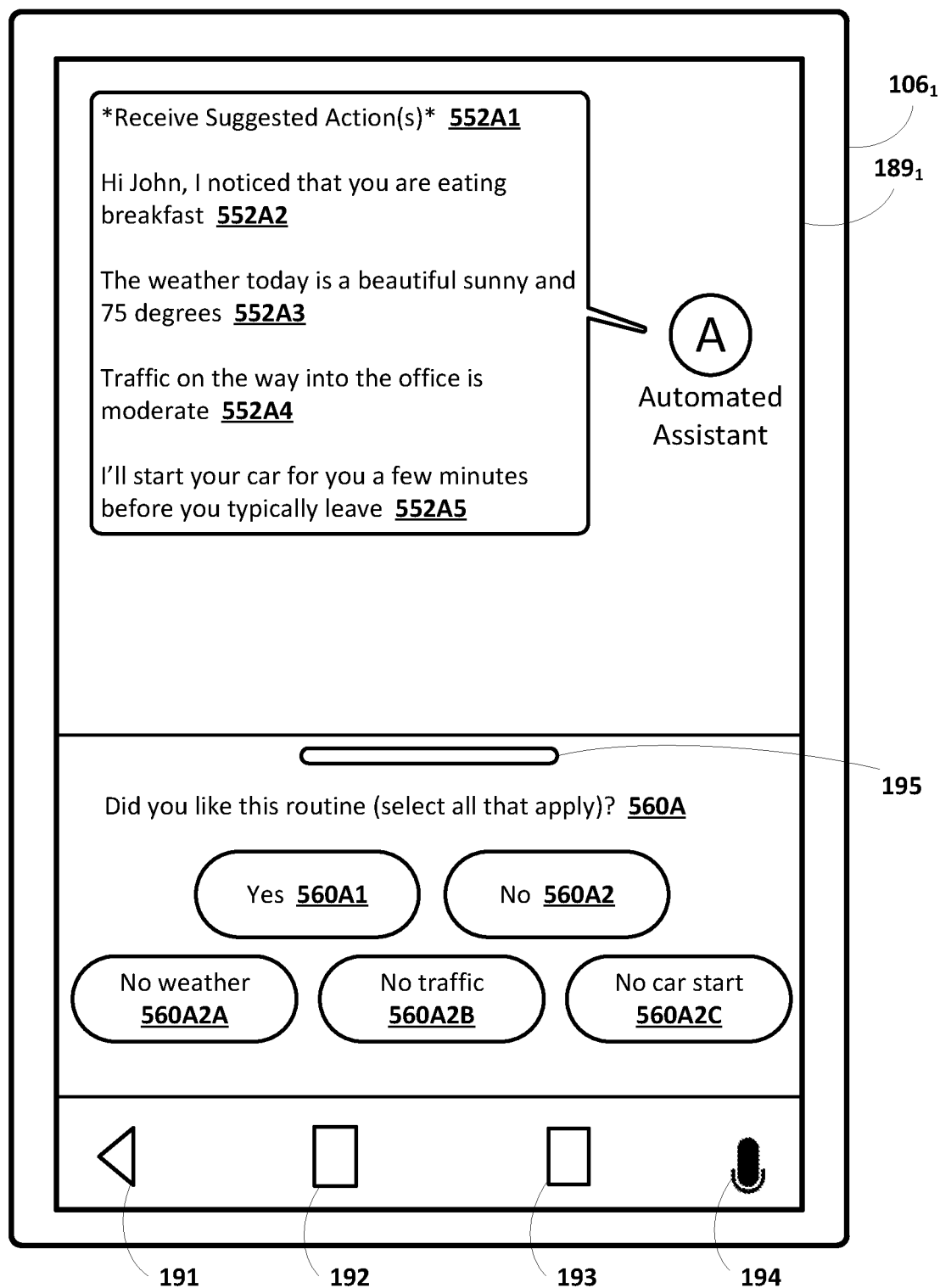
FIGS. 5A and 5B depict various non-limiting examples of user interactions with an automated assistant that is using an ambient sensing machine learning model, in accordance with various implementations.
Figure 5B:
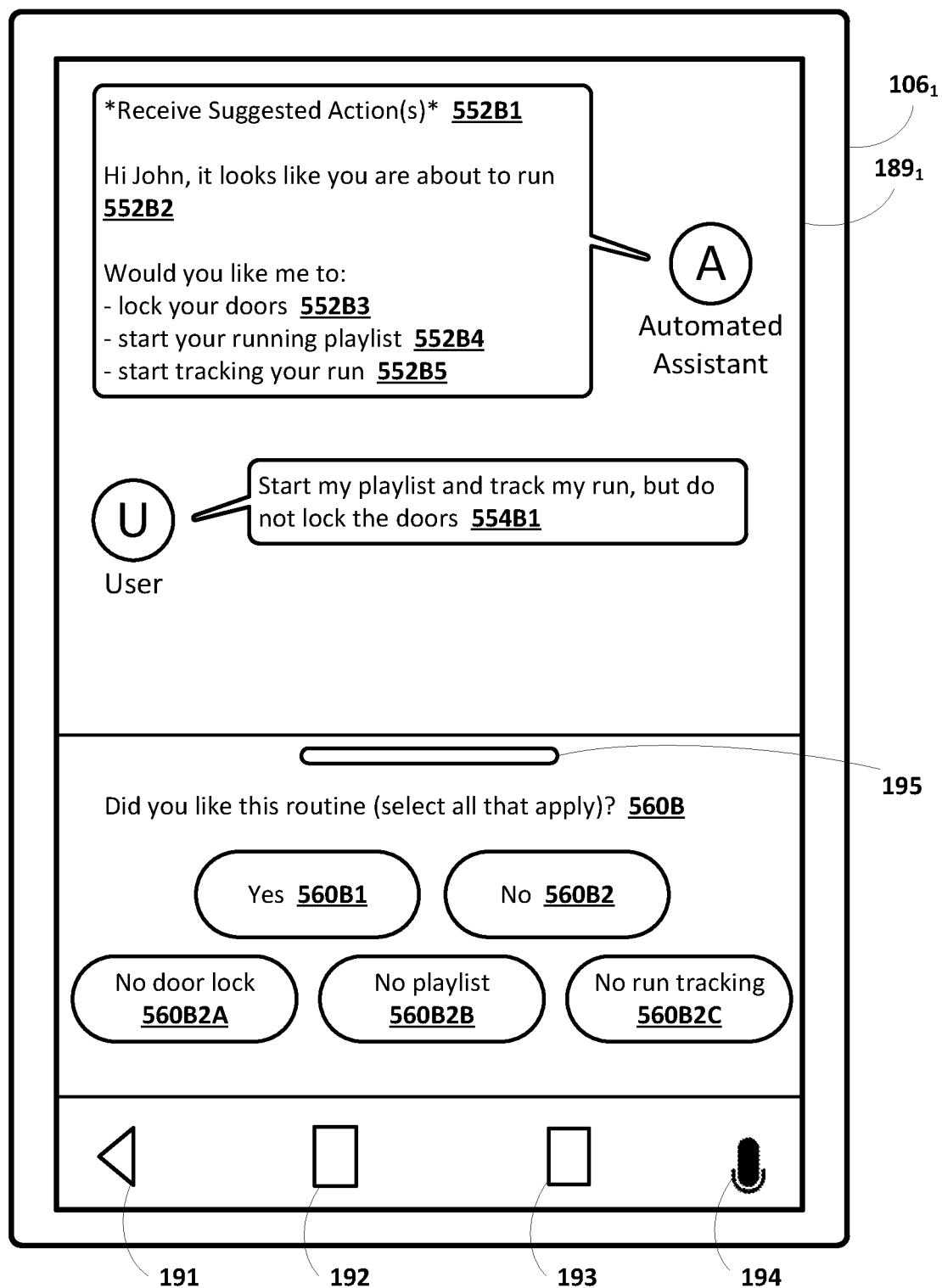

In some implementations, and subsequent to training the ambient sensing ML model, the automated assistant 120 can cause the action suggestion engine 170 to utilize the ambient sensing ML model in generating one or more suggested actions that are suggested for performance, on behalf of the user, by the automated assistant 120 via one or more of the assistant devices 106, 185 (e.g., described with respect to FIGS. 4, 5A, and 5B). The action suggestion engine 170 can generate one or more of the suggested actions based on processing instances of sensor data obtained via one or more of the assistant devices 106, 185. Further, the automated assistant 120 can cause the action processing engine 180 to initiate performance of one or more of the suggested actions in response to receiving a user selection of one or more of the suggested actions. For example, in some implementations, the automated assistant 120 can cause the ambient state engine 160 to determine an ambient state of a user and/or an environment of the user, and can cause the action suggestion engine to process the ambient state, using the ambient sensing ML model stored in the ML model(s) database 192, to generate one or more of the suggested actions. As another example, in other implementations such as when the ambient sensing ML model is an end-to-end model, the automated assistant 120 can cause the action suggestion engine to process the instance of the sensor data, using the ambient sensing ML model stored in the ML model(s) database 192, to generate one or more of the suggested actions without explicitly determining the ambient state using the ambient state engine 160. In various implementations, the automated assistant 120 may only cause the action suggestion engine 170 to process the ambient state and/or the instance of the sensor data to generate one or more of the suggested action in response to determining that the instance of the sensor data does, in fact, correspond to an ambient sensing event (e.g., described above with respect to the ambient sensing event engine 160).

In some versions of those implementations, the automated assistant 120 can cause an indication of one or more of the suggested actions to be provided for presentation to a user. For example, a corresponding suggestion chip or selectable graphical element can be visually rendered for presentation to the user via a display of one or more of the assistant devices 106, 185. The corresponding suggestion chips or selectable graphical elements can be associated with a disparate one of the suggested actions (e.g., as disparate actions that can be performed by the automated assistant 120 as shown in FIGS. 5A and 5B) and/or associated with each of the one or more suggested actions (e.g., as a routine to be performed by the automated assistant 120). In this example, the action processing engine 180 can initiate performance of one or more of the suggested actions based on a user selection of one or more of the corresponding suggestion chips or selectable graphical elements (e.g., generate fulfillment data and transmit it to the appropriate one of the assistant devices 106, 185). As another example, synthesized speech audio data that includes synthesized speech having an indication of the one or more suggested actions can be audibly rendered for presentation to the user via speaker(s) of one or more of the assistant devices 106, 185. The synthesized speech can include an indication of the one or more suggested actions. In this example, the action processing engine 180 can initiate performance of one or more of the suggested actions based on processing spoken input that is responsive to the synthesized speech and that selects one or more of the suggested actions (e.g., generate fulfillment data and transmit it to the appropriate one of the assistant devices 106, 185).

In some additional or alternative versions of those implementations, one or more of the suggested actions can be automatically performed by the automated assistant 120. Causing one or more of the suggested actions to automatically performed by the automated assistant 120 can be based on, for example, corresponding predicted measures associated with one or more of the suggested actions satisfying a threshold. In other words, if the automated assistant 120 is sufficiently confident that the user will perform a given action (e.g., initiate playing of a running playlist when the user pairs headphones with a mobile device and starts tracking a run), then the automated assistant 120 can automatically perform the suggested action without causing the indication of one or more of the suggested actions to be provided for presentation to the user. In these implementations, the automated assistant 120 can cause the action processing engine 180 to initiate performance of one or more of the suggested actions that are to be automatically performed without causing an indication of one or more of the suggested actions to be provided for presentation to a user. However, the automated assistant 120 can cause one or more of the assistant devices 106, 185 to provide a notification to the user as to why one or more of the suggested actions are being automatically performed (e.g., "It looks like you just started a run, I'll begin tracking it for you").

Although FIG. 1 is depicted as having a particular configuration of components implemented by the assistant devices and/or server(s), and is depicted having the assistant devices and/or server(s) communicating over particular networks, it should be understood that is for the sake of example and is not meant to be limiting. For example, the assistant input devices 106 and/or the assistant non-input devices 185 may be directly communicatively coupled with each other over the network(s). As another example, operations of the one or more cloud-based automated assistant components 119 can be implemented entirely locally at one or more of the assistant input devices 106 and/or one or more of the assistant non-input devices 185. As yet another example, instance(s) of various ML models stored in the ML model(s) database 192 may be stored locally at the assistant devices 106, 185. Accordingly, the techniques described herein can be implemented entirely locally at one or more of the assistant devices 106, 185. Further, in implementations where data (e.g., device activity, audio data or recognized text corresponding thereto, device topology representations, and/or any other data described herein) is transmitted over any of the one or more networks 110 of FIG. 1, the data can be encrypted, filtered, or otherwise protected in any manner to ensure privacy of user(s).

Although techniques are described herein with respect to generating suggested actions to be performed by the automated assistant, on behalf of the user, at inference, it should be understood that is for the sake of example and is not meant to be limiting. For example, the techniques described herein can also generate one or more notifications for the user to perform one or more suggested actions that the automated assistant may not be able to perform. For instance, assume an ambient state determined based on processing an instance of sensor data is a laundry ambient state (e.g., determined based on processing audio data that captures noise from a washing machine (e.g., spinning sounds) followed by noise from a dryer (e.g., tumbler sounds)). Further assume that, upon completion of a washing cycle or a drying cycle, the user switches the laundry from the washer to the dryer and/or removes the laundry out of the dryer (e.g., determined based on device data generated by a smart washer/dryer and/or based on other sensor data (e.g., a location of the user in a laundry room, ambient noise that captures the user performing a laundry action, etc.)). In this example, the training instance output can include an indication of a notification for the user to perform a laundry action (e.g., "it's time to switch loads of laundry", "your laundry is complete", etc.) when the washer/dryer sounds stop and/or after a predetermined period of time (e.g., a time of the washer cycle and/or a time of the dryer cycle). Accordingly, the ambient sensing ML model can also be trained to generate one or more suggested actions for the user to perform since the automated assistant may not be able to perform some actions (e.g., switching loads of laundry). In some instances, the training instance input can optionally include an additional ambient state, such as an at home or arrived home ambient state, determined based on pairing data of a given assistant device (e.g., a mobile device of the user) with another assistant device or home network. By including this pair of ambient states in the training instance input, the ambient sensing ML model can learn to only provide these notifications when the user arrives at home, thereby providing the notification at a time when the user can act upon the notification (e.g., the user cannot switch loads of laundry while away from home).

By using the techniques described herein, various technical advantages can be achieved. As one non-limiting example, in implementations where the one or more suggested actions that are provided for presentation to a user, explicit user inputs can be simplified (e.g., single-click, single-touch, "Yes" or "No" rather than a full spoken utterance, etc.) to cause performance of one or more of the suggested actions. Further, in implementations where one or more of the suggested actions are automatically performed on behalf of the user, explicit user inputs to perform one or more of the suggested actions may be eliminated altogether. Moreover, in training the ambient sensing ML model to generate one or more of the suggested actions based on ambient states and temporally corresponding actions for a user, the ambient sensing ML model can more robustly and/or accurately generate one or more of the suggested actions that are best suited for the user given the ambient state. As a result, a quantity and/or duration of user inputs that are received by one or more assistant devices can be reduced because the user need not provide free-form input to cause one or more of the suggested actions to be performed, thereby conserving computational resources at one or more of the assistant devices and/or network resources by reducing network traffic.

Turning now to FIG. 2, a flowchart illustrating an example method 200 of generating a plurality of training instances for training an ambient sensing machine learning model is depicted. For convenience, the operations of the method 200 are described with reference to a system that performs the operations. The system of the method 200 includes one or more processors and/or other component(s) of a computing device. For example, the system of the method 200 can be implemented by one or more of the assistant devices 106, 185, of FIG. 1, 3A, 3B, 5A, or 5B, cloud-based automated assistant component(s) 119 of FIG. 1, computing device 610 of FIG. 6, one or more servers, other computing devices, and/or any combination thereof. Moreover, while operations of the method 200 are shown in a particular order, this is not meant to be limiting. One or more operations may be reordered, omitted, and/or added.

At block 252, the system obtains, via one or more sensors of an assistant device of a user, an instance of sensor data. The instance of the sensor data can include, for example, audio data (e.g., audio data capturing spoken utterances, ambient noise, etc.), motion data (e.g., GPS signal(s), accelerometer data, etc.), pairing data, device state data, and/or any other sensor data generated by various sensors of the assistant device of the user and/or one or more additional assistant devices of the user.

At block 254, the system determines whether the instance of the sensor data corresponds to an ambient sensing event. The system can determine the instance of the sensor data corresponds to an ambient sensing event based on, for example, the instance of the sensor data including audio data that captures a particular noise and/or noise above a threshold noise level, motion data that captures movement information for a particular duration of time, pairing data that captures pairing information for one or more particular assistant devices over network(s), device state data that detects a state change in one or more assistant devices and/or some other device event (e.g., a particular state being maintained for a particular amount of time), and/or temporal data. In other words, the system can prevent training instances from being generated based on happenstance ambient sensor data such that any resulting training instances do, in fact, correspond to ambient sensing events for which one or more suggested actions should be generated. If, at an iteration of block 254, the system determines the instance of the sensor data does not correspond to an ambient sensing event, then the system returns to block 252 to obtain an additional instance of sensor data via one or more of the sensors of the assistant device, and determines whether the additional instance of the sensor data corresponds to an ambient sensing event at a subsequent iteration of block 254. The system may repeat the operations of blocks 252 and 254 until it is determined that there is an ambient sensing event. If, at an iteration of block 254, the system determines the instance of the sensor data does correspond to an ambient sensing event, then the system proceeds to block 256.

At block 256, the system determines whether there are one or more temporally corresponding actions for the ambient sensing event. If, at an iteration of block 256, the system determines there are no temporally corresponding actions for the ambient sensing event, then the system returns to block 252 to obtain an additional instance of sensor data via one or more of the sensors of the assistant device, and determines whether the additional instance of the sensor data corresponds to an ambient sensing event at a subsequent iteration of block 254. Further, and assuming the system determines the additional instance of the sensor data corresponds to an ambient sensing event at a subsequent iteration of block 254, the system determines whether there are one or more temporally corresponding actions for the ambient sensing event at a subsequent iteration of block 256. The system may repeat the operations of blocks 252, 254, and 256 until it is determined that there is an ambient sensing event. If, at an iteration of block 256, the system determines there are one or more temporally corresponding actions for the ambient sensing event, then the system proceeds to block 258.

At block 258, the system generates, based on the instance of the sensor data and one or more of the temporally corresponding actions, one or more training instances to be utilized in training an ambient sensing ML model. In some implementations, a single training instance can be generated based on the instance of the sensor data and the one or more temporally corresponding actions. In additional or alternative implementations, multiple training instances can be generated based on the instance of the sensor data and the one or more temporally corresponding actions. Each of the one or more training instances can include training instance input and training instance output. For example, and as indicated at sub-block 258A, the training instance input can include an ambient state determined based at least on the instance of the sensor data. Further, as indicated at sub-block 258B, the training instance output can include an indication of one or more of the temporally corresponding actions.

For example, and referring briefly to FIGS. 3A and 3B, additional description of various components of FIG. 1 and generating training instances in accordance with blocks 252-258 of the method 200 of FIG. 2 is now provided. A home floorplan is depicted in FIGS. 3A and 3B. The depicted floorplan includes a plurality of rooms, 250-262. A plurality of assistant input devices $106_{1-5}$ are deployed throughout at least some of the rooms. Each of the assistant input devices $106_{1-5}$ may implement a respective instance of the automated assistant client 118 configured with selected aspects of the present disclosure and may include one or more input devices, such as microphone(s) that are capable of capturing utterances spoken by a person nearby. For example, a first assistant input device $106_1$ taking the form of an interactive standalone speaker and display device (e.g., display screen, projector, etc.) is deployed in room 250, which in this example is a kitchen. A second assistant input device $106_2$ taking the form of a so-called "smart" television (e.g., a networked television with one or more processors that implement a respective instance of the automated assistant client 118) is deployed in room 252, which in this example is a den. A third assistant input device $106_3$ taking the form of an interactive standalone speaker without a display is deployed in room 254, which in this example is a bedroom. A fourth assistant input device $106_4$ taking the form of another interactive standalone speaker is deployed in room 256, which in this example is a living room. A fifth assistant input device 106$_5$ also taking the form of a smart television is also deployed in room 250, which in this example is a kitchen.

While not depicted in FIGS. 3A and 3B, the plurality of assistant input devices 106$_{1-5}$ may be communicatively coupled with each other and/or other resources (e.g., the Internet) via one or more wired or wireless WANs and/or LANs (e.g., via the networks 110 of FIG. 1). Additionally, other assistant input devices—particularly mobile devices such as smart phones, tablets, laptops, wearable devices, etc.—may also be present, e.g., carried by one or more persons in the home (e.g., user 101) and may or may not also be connected to the same WANs and/or LANs. It should be understood that the configuration of assistant input devices depicted in FIGS. 3A and 3B is just one example; more or fewer and/or different assistant input devices 106 may be deployed across any number of other rooms and/or areas of the home, and/or in locations other than a residential home (e.g., a business, a hotel, a public place, an airport, a vehicle, and/or other locations or spaces).

Further depicted in FIGS. 3A and 3B are a plurality of assistant non-input devices 185$_{1-5}$. For example, a first assistant non-input device 185$_1$ taking the form of a smart doorbell is deployed on the exterior of the home near a front door of the home. A second assistant non-input device 185$_2$ taking the form of a smart lock is deployed on the exterior of the home on the front door of the home. A third assistant non-input device 185$_3$ taking the form of a smart clothes washer is deployed in room 262, which in this example is a laundry room. A fourth assistant non-input device 185$_4$ taking the form of a door open/close sensor is deployed near a rear door in room 262, and detects whether the rear door is open or closed. A fifth assistant non-input device 185$_5$ taking the form of a smart thermostat is deployed in room 252, which in this example is a den.

Each of the plurality of assistant non-input devices 185 can communicate (e.g., via the networks 110 of FIG. 1) with a respective assistant non-input system to provide data to the respective assistant non-input system and optionally to be controlled based on commands provided by the respective assistant non-input system 180. One or more of the assistant non-input devices 185 can additionally or alternatively communicate (e.g., via the networks 110 of FIG. 1) directly with one or more of the assistant input devices 106 to provide data to one or more of the assistant input devices 106 and optionally to be controlled based on commands provided by one or more of the assistant input devices 106. It should be understood that the configuration of assistant non-input devices 185 depicted in FIGS. 3A and 3B is just one example; more or fewer and/or different assistant non-input devices 185 may be deployed across any number of other rooms and/or areas of the home, and/or in locations other than a residential home (e.g., a business, a hotel, a public place, an airport, a vehicle, and/or other locations or spaces).

For example, and with respect to FIG. 3A, assume a user 101 associated with the ecosystem is located in room 250, which in this example is a kitchen, makes breakfast as indicated by sizzling skillet 352A1, and subsequently eats the breakfast in the room 250 as indicated by meal 352A2. As the user 101 makes and eats breakfast, one or more of the assistant devices 106, 185 may generate sensor data. For example, further assume microphones of one or more of the assistant input devices 106$_1$ or 106$_5$ generate audio data that corresponds to noises of the sizzling skillet 352A1 and the eating of the meal 352A2. In this example, the kitchen noises of the user 101 cooking and eating may correspond to an ambient sensing event, and the resulting ambient state determined based on the audio data generated by one or more of the assistant input devices 106$_1$ or 106$_5$ may correspond to a cooking ambient state, eating ambient state, breakfast ambient state, and/or another ambient state determined based on the audio data, the location of the user 101 in the kitchen, and/or other sensor data.

Further assume that, as the user 101 is cooking and/or eating, the user 101 provides a spoken utterance 354A1 of "Assistant what's the weather?" at a first time (e.g., time=t1) that invokes the automated assistant 120 causes it to retrieve and present weather information to the user 101, provides a spoken utterance 354A2 of "How's traffic?" at a second time (e.g., time=t2) that causes the automated assistant 120 to retrieve and present traffic information to the user 101, and provides a spoken utterance 354A3 of "Assistant. Start my car" at a third time (e.g., time=t3) that invokes the automated assistant 120 and causes it to automatically start a car of the user 101. In this example, actions associated with the spoken utterances 354A1 (e.g., a weather action), 354A2 (e.g., a traffic action), and 354A3 (e.g., a car start action) can each be considered temporally corresponding actions for the determined ambient state. The actions associated with the spoken utterances 354A1, 354A2, and/or 354A3 can be considered temporally corresponding since they are received within a threshold duration of time of obtaining the audio data utilized to determine the ambient state. Notably, the threshold duration of time for identifying temporally corresponding actions can vary. For instance, assume that the spoken utterance 354A1 is received when the user begins cooking breakfast, and that the spoken utterance 354A2 is received as a follow-up utterance to the spoken utterance 354A1 such that the user needs not re-invoke the automated assistant 120 (e.g., via a hotword, software button, hardware button, gesture-based invocation, etc.) at the second time. Further assume the third time when the spoken utterance 354A3 is received is after the user 101 finishes eating 20 minutes later. In some instances, the third time can still be considered temporally corresponding because the sensor data indicates a breakfast ambient state is still applicable to the user 101 and/or the environment of the user 101. Thus, any user-initiated performed before, during, and/or after the instance of the sensor data is obtained can be considered a temporally corresponding action for the ambient state.

Accordingly, the instance of the audio data generated by one or more of the assistant input devices 106$_1$ or 106$_5$ capturing the cooking noises and/or an indication of the ambient state determined based on the instance of the audio data can be utilized as training instance input for a given training instance. Further, an indication of one or more of the actions corresponding to the spoken utterances 354A1, 354A2, and/or 354A3 can be utilized as training instance output for the given training instance. For instance, a training instance can include training instance input of the audio data corresponding to noises of the sizzling skillet 352A1 and the eating of the meal 352A2 and/or the cooking or breakfast ambient state, and training instance output of an indication of the weather action, the traffic action, and the car start action. Also, for instance, a first training instance can include training instance input of the audio data corresponding to noises of the sizzling skillet 352A1 and the eating of the meal 352A2 and/or the cooking or breakfast ambient state, and training instance output of an indication of the weather action; a second training instance can include training instance input of the audio data corresponding to noises of the sizzling skillet 352A1 and the eating of the meal 352A2 and/or the cooking or breakfast ambient state, and training instance output of an indication of the traffic action; and a third training instance can include training instance input of the audio data corresponding to noises of the sizzling skillet 352A1 and the eating of the meal 352A2 and/or the cooking or breakfast ambient state, and training instance output of an indication of and the car start action. Also, for instance, a first training instance can include training instance input of the audio data corresponding to noises of the sizzling skillet 352A1 and the eating of the meal 352A2 and/or the cooking or breakfast ambient state, and training instance output of an indication of the weather action and the traffic action; a second training instance can include training instance input of the audio data corresponding to noises of the sizzling skillet 352A1 and the eating of the meal 352A2 and/or the cooking or breakfast ambient state, and training instance output of an indication of the car start action. By training the ambient sensing ML model based on these training instances, the ambient sensing ML model can be trained to infer assistant routines for a user based on processing instances of ambient sensor data.

As another example, and with respect to FIG. 3B, assume the user 101 associated with the ecosystem is located immediately outside the primary dwelling. As the user 101 is outside, one or more of the assistant devices 106, 185 may generate sensor data. For example, further assume a mobile device of the user (e.g., an assistant input device that is not depicted) generates motion data using GPS sensor(s) and/or accelerometers of the mobile device. In this example, the motion data may correspond to an ambient sensing event, and the resulting ambient state determined based on the motion data generated by the mobile device may correspond to a workout ambient state, running ambient state, jogging ambient state, waking ambient state, and/or another ambient state determined based on the motion data, the location of the user 101 outside the home, and/or other sensor data. Further, the resulting ambient state may additionally or alternatively be an away ambient state since the user 101 has left the primary dwelling.

Further assume that, as the user 101 is outside, the user 101 pairs a mobile device with Bluetooth headphones at a first time (e.g., time=t1) as indicated by 352B1, provides a spoken utterance 354B2 of "Assistant, lock the back door" at a second time (e.g., time=t2) that causes the automated assistant 120 to lock the back door via the smart lock 185₄, and initiates tracking a run with a 3P software application at a third time (e.g., time=t3) as indicated by 352B3. In this example, actions associated with the pairing 354B1 (e.g., a pairing action), the spoken utterance 354B2 (e.g., a door lock action), and the 3P software application 354A3 (e.g., a run tracking action) can each be considered temporally corresponding actions for the determined ambient state. These actions can be considered temporally corresponding since they are received within a threshold duration of time of obtaining the motion data utilized to determine the ambient state and/or the user 101 leaving the primary dwelling. Notably, the threshold duration of time for identifying temporally corresponding actions can vary. For instance, and in contrast with FIG. 3A, the first time, the second time, and the third time can be relatively shorter since the actions indicated by 352B1, 352B2, and/or 352B3 are generally performed within a shorter duration of time. Thus, any user-initiated performed before, during, and/or after the instance of the sensor data is obtained can be considered a temporally corresponding action for the ambient state.

Accordingly, the instance of the motion data generated by the mobile device of the user 101 capturing the motion information and/or an indication of the ambient state determined based on the instance of the motion data can be utilized as training instance input for a given training instance. Further, an indication of one or more of the actions associated with 352B1, 352B2, and/or 352B3 can be utilized as training instance output for the given training instance. For instance, a training instance can include training instance input of the motion data and/or pairing data or workout ambient state, and training instance output of an indication of the door lock action and run tracking action. Also, for instance, a first training instance can include training instance input of the motion data and/or pairing data, and training instance output of an indication of the door lock action; and a second training instance can include training instance input of the motion data and/or pairing data, and training instance output of an indication of the run tracking action.

Although particular examples are described with respect to FIGS. 3A and 3B, it should be understood those are provided for the sake of illustration and are not meant to be limiting. Moreover, while FIGS. 3A and 3B are described with respect to the primary dwelling of the user 101, it should be understood that is also for the sake of example and is not meant to be limiting.

Turning back to FIG. 2, at block 260, the system causes the ambient sensing ML model to be trained based on one or more of the training instances. For example, the system can cause the ambient sensing ML model to process the training instance input to generate an indication of one or more predicted actions. The indication of the one or more predicted actions can be compared to the indication of the one or more temporally corresponding actions included in the training instance output to generate one or more losses. The system can cause the ambient sensing ML model to be updated based on one or more of the losses. These operations can be repeated for a plurality of additional training instances to update the ambient sensing ML model.

At block 262, the system determines whether one or more conditions are satisfied. If, at an iteration of block 262, the system determines that one or more of the conditions are not satisfied, the system continues monitoring for satisfaction of one or more of the conditions at block 262. The one or more conditions can include, for example, that the assistant device is charging, that the assistant device has at least a threshold state of charge, that a temperature of the assistant device (based on one or more on-device temperature sensors) is less than a threshold, that the assistant device is not being held by a user, temporal condition(s) associated with the assistant device(s) (e.g., between a particular time period, every N hours, where N is a positive integer, and/or other temporal condition(s) associated with the assistant device), whether the ambient sensing ML model has been trained based on a threshold number of training instances, and/or other condition(s). In some implementations, while the system continues monitoring for satisfaction of one or more of the conditions at block 262, the system can continue generating additional training instances and/or training the ambient sensing ML model.

Moreover, while the operations of block 262 are depicted as occurring between blocks 260 and block 264, it should be understood that is for the sake of example and is not meant to be limiting. For example, the method 200 may employ multiple instances of block 262 prior to performing the operations of one or more other blocks included in the method 200. For instance, the system may store one or more instances of the sensor data, and withhold from performance of the operations of blocks 254, 256, 258, and 260 until one or more of the conditions are satisfied. Also, for instance, the system may perform the operations of blocks 252, 254, 256, and 258, but withhold from training the ambient sensing ML model until one or more of the conditions are satisfied (e.g., such as whether a threshold quantity of training instances is available for training the ambient sensing ML model).

If, at an iteration of block 262, the system determines that one or more of the conditions are satisfied, the system proceeds to block 264. At block 264, the system causes the trained ambient sensing ML model to be utilized in generating one or more suggested actions based on one or more additional instances of the sensor data.

Turning now to FIG. 4, a flowchart illustrating an example method 400 of using an ambient sensing machine learning model is depicted. For convenience, the operations of the method 400 are described with reference to a system that performs the operations. The system of the method 400 includes one or more processors and/or other component(s) of a computing device. For example, the system of the method 400 can be implemented by one or more of the assistant devices 106, 185, of FIG. 1, 3A, 3B, 5A, or 5B, cloud-based automated assistant component(s) 119 of FIG. 1, computing device 610 of FIG. 6, one or more servers, other computing devices, and/or any combination thereof. Moreover, while operations of the method 400 are shown in a particular order, this is not meant to be limiting. One or more operations may be reordered, omitted, and/or added.

At block 452, the system obtains, via one or more sensors of an assistant device of a user, an instance of sensor data. The instance of the sensor data can include, for example, audio data (e.g., audio data capturing spoken utterances, ambient noise, etc.), motion data (e.g., GPS signal(s), accelerometer data, etc.), pairing data, device state data, and/or any other sensor data generated by various sensors of the assistant device of the user and/or one or more additional assistant devices of the user.

At block 454, the system determines, based on the instance of the sensor data, an ambient state. The ambient state reflects an ambient state of the user of the assistant device and/or an environment of the user of the assistant device. The ambient state can be determined based on the instance of the sensor data.

At block 456, the system determines whether the ambient state corresponds to an ambient sensing event. The system can determine the ambient state corresponds to an ambient sensing event based on, for example, the instance of the sensor data including audio data that captures a particular noise and/or noise above a threshold noise level, motion data that captures movement information for a particular duration of time, pairing data that captures pairing information for one or more particular assistant devices over network(s), device state data that detects a state change in one or more assistant devices and/or some other device event (e.g., a particular state being maintained for a particular amount of time), and/or temporal data. In other words, the system may only process ambient states that do, in fact, correspond to ambient sensing events for which one or more suggested actions should be generated. If, at an iteration of block 456, the system determines the ambient state does not correspond to an ambient sensing event, then the system returns to block 452 to obtain an additional instance of sensor data via one or more of the sensors of the assistant device, determines an additional ambient state based on the additional instance of the sensor data at a subsequent iteration of block 454, and determines whether the additional ambient state corresponds to an ambient sensing event at a subsequent iteration of block 456. If, at an iteration of block 456, the system determines the ambient state corresponds to an ambient sensing event, then the system proceeds to block 458.

At block 458, the system processes, using a trained ambient sensing ML model, the ambient state to generate one or more suggested actions that are suggested to be performed on behalf of the user. In processing the ambient state to generate the one or more suggested action, the system can generate one or more corresponding predicted measures for each of the one or more suggested actions. In other words, the system can predict how likely it is that the user will perform one or more of the suggested actions based on processing an ambient state determined based on an instance of sensor data. In some implementations, block 456 may be omitted such that the system attempts to generate one or more suggested actions based on an ambient state, but may not provide any suggested actions for presentation to the user if no actions are associated with the ambient state (e.g., the corresponding predicted measures fail to satisfy a threshold measure and/or beyond are all beyond a threshold distance in embedding space).

At block 460, the system determines whether to automatically perform one or more of the suggested actions on behalf of the user. The system can perform one or more of the suggested actions via the assistant device of the user and/or one or more additional assistant devices of the user. The system can determine to perform one or more of the suggested actions based on corresponding predicted measures associated with the one or more suggested actions. The corresponding predicted measures can be, for example, generated in processing the ambient state using the ambient sensing ML model. For example, the system can determine to automatically perform the one or more suggested actions associated with corresponding predicted measures that satisfy a threshold measure. In some implementations, the system may not automatically perform any of the suggested actions. In other implementations, the system may automatically perform some of the one or more suggested actions, but not all of the one or more suggested actions. In other implementations, the system may automatically perform each of the one or more suggested actions. If, at an iteration of block 460, the system determines to automatically perform one or more of the suggested actions, the system proceeds to block 466. Block 466 is described below. If, at an iteration of block 460, the system determines not to automatically perform one or more of the suggested actions, the system proceeds to block 462.

At block 462, the system causes a corresponding representation of one or more of the suggested actions to be provided for presentation to the user via the assistant device and/or an additional assistant device of the user. At block 464, the system determines whether a user selection of the corresponding representation of one or more of the suggested actions is received from the user. The user selection can be, for example, touch input directed to a display of the assistant device, spoken input received by microphone(s) of the assistant device, etc. If, at an iteration of block 464, the system determines no user selection of the corresponding representation of one or more of the suggested actions is received from the user, then the system continues to monitor for the user selection at block 464. The system can continue monitoring for the user selection of one or more of the suggested actions for a threshold duration of time, until a user dismisses an interface associated with the one or more suggested actions (e.g., a prompt, notification, etc.). If, at an iteration of block 464, the system determines a user selection of the corresponding representation of one or more of the suggested actions is received from the user, then the system proceeds to block 462.

At block 462, the system causes one or more of the suggested actions to be performed, on behalf of the user, by the assistant device and/or an additional assistant device of the user. In some implementations, such as when the system arrives at the operations of block 466 from an instance of block 460, then one or more of the suggested actions can be performed automatically and without receiving any user input. In some of these implementations, a notification that one or more of the suggested actions have been automatically performed can be provided for presentation to the user. In additional or alternative implementations, such as when the system arrives at the operations of block 466 form an instance of block 464, the one or more suggested actions can be performed responsive to receiving the user selection.

At block 468, the system causes the ambient sensing ML model to be updated based on the user selection, or lack thereof, of the corresponding representation of one or more of the suggested actions. In implementations where a user selection of one or more of the suggested actions is received, the user selection can be utilized as a positive feedback signal to reinforce generation of one or more of the selected actions for the ambient state. In implementations where no user selection is received (or a user selection that omits one or more of the suggested actions), the lack of the user selection can be utilized as a negative feedback signal to bias against future generation of one or more of the selected actions for the ambient state. For instance, additional training instances that include and/or omit certain actions based on the user selection can be generated based on the user selection, and the ambient sensing ML model can be further trained based on those additional training instances. In this manner, the ambient sensing ML model can generate suggested actions that are most relevant for a user, thereby reducing a quantity of user inputs received at the assistant devices.

Turning now to FIGS. 5A and 5B, various non-limiting examples of user interactions with an automated assistant that is using an ambient sensing ML model are provided. The automated assistant can implement a one or more of the components component(s) and/or engines depicted in FIG. 1 locally at assistant input device $106_1$ and/or remotely at one or more servers in communication with the assistant input device $106_1$ over network(s) (e.g., the networks 110 of FIG. 1). The user interactions of FIG. 5A corresponds to a user interaction with the automated assistant when an ambient state corresponding to FIG. 3A is subsequently determined. Further, the user interactions of FIG. 5B corresponds to a user interaction with the automated assistant when an ambient state corresponding to FIG. 3B is subsequently determined The assistant input device $106_1$ depicted in FIGS. 5A and 5B may include various user interface components including, for example, microphone(s) to generate audio data based on spoken utterances and/or other audible input, speaker(s) to audibly render synthesized speech and/or other audible output, and a display $189_1$ to receive touch input and/or to visually render transcriptions and/or other visual output. Further, the display $189_1$ of the assistant input device $106_1$ includes various system interface elements 191, 192, and 193 (e.g., hardware and/or software interface elements) that may be interacted with by a user (e.g., the user 101 of FIGS. 3A and 3B) to cause the assistant input device $106_1$ to perform one or more actions. The display $189_1$ of the assistant input device $106_1$ enables the user to interact with content rendered on the display $189_1$ by touch input (e.g., by directing user input to the display $189_1$ or portions thereof) and/or by spoken input (e.g., by selecting microphone interface element 194—or just by speaking without necessarily selecting the microphone interface element 194 (i.e., the automated assistant 120 may monitor for one or more terms or phrases, gesture(s) gaze(s), mouth movement(s), lip movement(s), and/or other conditions to activate spoken input) at the assistant input device $106_1$).

For example, and with respect to FIG. 5A, assume a user makes and subsequently breakfast in a kitchen of a primary dwelling (e.g., as described with respect to FIG. 3A), and assume the assistant input device $106_1$ (or another assistant device in the ecosystem) generates audio data that captures the user making and eating breakfast. In this example, the automated assistant can receive one or more suggested actions as indicated by 552A1 based on processing at least the audio data, and cause a corresponding representation of the one or more suggested actions to be presented to the user. In some implementations, the corresponding representations can be, for example, audible representations such that synthesized speech audio data is audibly rendered via speaker(s) of the assistant input device $106_1$. In these implementations, the user can select one or more of the suggested actions for performance by the automated assistant via spoken input that is responsive to the corresponding representations being audibly presented.

In additional or alternative implementations, the corresponding representations can be, for example, visual representations such that corresponding selectable elements or suggestion chips can be visually rendered via the display $189_1$ of the assistant input device $106_1$. These visual representations can be presented via the display $189_1$ at a home screen of the assistant input device $106_1$, at a lock screen of the assistant input device $106_1$, at an automated assistant application as a zero-state suggested action or as part of transcription of a dialog between the user and the automated assistant, at a notifications interface (e.g., pop-up notification), and/or in any other manner. In these implementations, the user can select one or more of the suggested actions for performance by the automated assistant via touch or spoken input that is responsive to the corresponding representations being visually presented. In various implementations, the automated assistant can cause an indication of the determined ambient state to be presented for presentation to this user. This informs the user as to why the one or more suggested are being provided for presentation.

For example, and as depicted in FIG. 5A, the automated assistant can cause the assistant input device $106_1$ to render synthesized speech 552A2 by saying "Hi John, I noticed that you are eating breakfast". Further, assume the automated assistant is sufficiently confident that the user will ask the assistant to provide weather and traffic updates (e.g., based on the corresponding predicted measures associated with the weather and traffic actions satisfy a threshold measure). Accordingly, the automated assistant can automatically perform a weather action and a traffic action based on the user making and/or eating breakfast, and cause synthesized speech 552A3 of "The weather today is a beautiful sunny and 75 degrees" and synthesized speech 552A4 of "Traffic on the way into the office is moderate" to be audibly presented to the user via the assistant input device $106_1$ (e.g., as part of a single utterance or multiple utterances). Further assume the automated assistant is sufficiently confident that the user will ask the assistant to start his or her car (e.g., based on the corresponding predicted measures associated with the car start action satisfies a threshold measure).

However, the automated assistant may not automatically cause the user's car to be started when the synthesized speech 552A3 and 554A4 to satisfy the other actions is provided. Rather, the automated assistant may cause synthesized speech 552A5 of "I'll start your car for you a few minutes before you typically leave" to be visually and/or audibly presented to the user via the assistant input device 106₁ and subsequently start the user's car before the user leaves. This temporal difference between performance of the weather and traffic actions and performance of the car start action can be learned by the ambient sensing ML model in implementations where training instances include temporal data associated with one or more of the temporally corresponding actions.

Additionally, or alternatively, an actions interface can include various selectable elements. Notably, the actions interface includes a prompt 560A of "Do you like this routine (select all that apply)?" in reference to the suggested actions being a morning or breakfast routine that was inferred by the automated assistant based on the ambient state using the ambient sensing ML model. The prompt 560A includes various selectable elements that, when selected, refine the inferred routine and/or enable the ambient sensing ML model to update based on the user selection (e.g., described with respect to block 468 of FIG. 4). In particular, selection of a first selectable element 560A1 of "Yes" indicates the user likes the routine and can be utilized as a positive feedback signal in updating the ambient sensing ML model for the routine as a whole, selection of a second selectable element 560A2 of "No" indicates the user does not like the routine and can be utilized as a negative feedback signal in updating the ambient sensing ML model for the routine as a whole, selection of a third selectable element 560A2A of "No weather" indicates the user does not like the weather action of the routine and can be utilized as a negative feedback signal in updating the ambient sensing ML model for the weather action, selection of a fourth selectable element 560A2B of "No traffic" indicates the user does not like the traffic action of the routine and can be utilized as a negative feedback signal in updating the ambient sensing ML model for the traffic action, and selection of a fifth selectable element 560A2C of "No car start" indicates the user does not like the car start action of the routine and can be utilized as a negative feedback signal in updating the ambient sensing ML model for the car start action. Moreover, the actions interface may include a slidable element 195 to dismiss the actions interface, which can be used as a neutral (e.g., if one or more actions are performed) or negative signal (e.g., if no actions are performed) for updating the ambient sensing ML model.

As another example, and with respect to FIG. 5B, assume a user is located immediately outside of a primary dwelling (e.g., as described with respect to FIG. 3AB), and assume the assistant input device 106₁ detects pairing of the assistant input device 106₁ with Bluetooth headphones and generates motion data that captures the user walking. In this example, the automated assistant can receive one or more suggested actions as indicated by 552B1 based on processing at least the pairing data and motion data, and cause a corresponding representation of the one or more suggested actions to be presented to the user. In some implementations, the corresponding representations can be, for example, audible representations such that synthesized speech audio data is audibly rendered via speaker(s) of the assistant input device 106₁. In these implementations, the user can select one or more of the suggested actions for performance by the automated assistant via spoken input that is responsive to the corresponding representations being audibly presented (e.g., as shown by spoken input 554B1 of the user).

In additional or alternative implementations, the corresponding representations can be, for example, visual representations such that corresponding selectable elements or suggestion chips can be visually rendered via the display 189₁ of the assistant input device 106₁ as described with respect to FIG. 5A. For example, and as depicted in FIG. 5B, the automated assistant can cause the assistant input device 106₁ to render synthesized speech 552B2 by saying "Hi John, it looks like you are about to run". Further, assume the automated assistant is not sufficiently confident that the user will lock their doors, start a running playlist, or start tracking a run (e.g., based on the corresponding predicted measures associated with these actions failing to satisfy a threshold measure). Accordingly, the automated assistant can cause a list of the suggested actions to be provided for presentation to the user (e.g., "Would you like me to") via synthesized speech 552B3 of "lock your doors", synthesized speech 552B4 of "start your running playlist", and synthesized speech 552B5 of "start tracking your run" to be audibly presented to the user via the assistant input device 106₁ (e.g., as part of a single utterance or multiple utterances).

Additionally, or alternatively, an actions interface can include various selectable elements. Notably, the actions interface includes a prompt 560B of "Do you like this routine (select all that apply)?" in reference to the suggested actions being a morning or breakfast routine that was inferred by the automated assistant based on the ambient state using the ambient sensing ML model. The prompt 560B includes various selectable elements that, when selected, refine the inferred routine and/or enable the ambient sensing ML model to update based on the user selection (e.g., described with respect to block 468 of FIG. 4). In particular, selection of a first selectable element 560B1 of "Yes" indicates the user likes the routine and can be utilized as a positive feedback signal in updating the ambient sensing ML model for the routine as a whole, selection of a second selectable element 560B2 of "No" indicates the user does not like the routine and can be utilized as a negative feedback signal in updating the ambient sensing ML model for the routine as a whole, selection of a third selectable element 560B2A of "No door lock" indicates the user does not like the door lock action of the routine and can be utilized as a negative feedback signal in updating the ambient sensing ML model for the weather action, selection of a fourth selectable element 560B2B of "No playlist" indicates the user does not like the playlist action of the routine and can be utilized as a negative feedback signal in updating the ambient sensing ML model for the playlist action, and selection of a fifth selectable element 560B2C of "No run tracking" indicates the user does not like the run tracking action of the routine and can be utilized as a negative feedback signal in updating the ambient sensing ML model for the run tracking action. Moreover, the actions interface may include a slidable element 195 to dismiss the actions interface, which can be used as a neutral (e.g., if one or more actions are performed) or negative signal (e.g., if no actions are performed) for updating the ambient sensing ML model. Further assume the user provides the spoken input 554B1 of "Start my playlist and track my run, but do not lock the doors". In this example, the automated assistant can initiate playing music from the playlist and begin tracking the run (e.g., via the software application described with respect to FIG. 3B). However, the automated assistant will not control the smart lock.

Although particular examples are described with respect to FIGS. 5A and 5B, it should be understood those are provided for the sake of illustration and are not meant to be limiting. Further, while FIGS. 5A and 5B are described with respect to the primary dwelling of the user 101 from FIGS. 3A and 3B, it should be understood that is also for the sake of example and is not meant to be limiting. Moreover, while particular selectable elements are described with respect to FIGS. 5A and 5B, it should be understood that is also for the sake of example and is not meant to be limiting. For instance, a graphical selectable element can be provided that, when selected, causes the automated assistant to automatically perform one or more of the suggested actions any time the associated ambient state is entered (and optionally obviating the need for any processing via the ambient sensing ML model). This enables assistant routines that are contextually relevant to a user to be established using reduced user input (e.g., the user need not manually define ambient condition(s) to trigger a routine or manually define a routine). Moreover, these routines can be established in a more efficient manner in that the user may not realize actions being performed can be part of an assistant routine.

Further, although a particular order of presenting and/or performing the one or more suggested actions are described with respect to FIGS. 5A and 5B, it should be understood that is also for the sake of example and is not meant to be limiting. In various implementations, the automated assistant can cause one or more of the suggested actions to be performed automatically based on the corresponding predicted measures associated with one or more of the suggested actions or in response to receiving user input that cause performance of one or more of the actions. The automated assistant may be highly confident that the user will perform these suggested actions (e.g., based on the corresponding predicted measures associated with these suggested actions). Further, the automated assistant can prompt to perform one or more other suggested actions that the automated assistant is less confident that the user will perform (e.g., based on the corresponding predicted measures associated with these other suggested actions). For example, and with respect to FIG. 5A, the automated assistant can automatically cause the weather action and the traffic action to be automatically performed. However, the automated assistant can prompt the user "would you also like me to start your car" (and optionally allow the user to define a time period prior to starting the car). Also, for example, and with respect to FIG. 5A, the automated assistant can cause corresponding representations of the weather action and the traffic action to be provided for presentation to the user. However, if the user does not provide any selection that causes those actions to be performed, the automated assistant may not prompt the user about performance of the car start action if the corresponding predicted measures indicated the user is more likely to cause performance of the weather action and the action. Accordingly, a user experience provided by the automated assistant can be dynamic in that the automated assistant can tailor the user experience not only based on the one or more suggested actions and the corresponding predicted measures associated therewith, but also based on how the user interacts with the automated assistant.

Moreover, while aspects of the invention are described herein as training and utilizing an ambient sensing model to generate one or more suggested actions to be performed by the automated assistance on behalf of a given user, it should be understood that is for the sake of example and is not meant to be limiting. In some implementations, multiple users (e.g., members of a household, guests at a hotel, employees at an office, etc.) may be associated with the assistant devices described herein. In some of those implementations, a respective instance of the ambient sensing ML model can be trained for each of the respective users (e.g., based on the temporally corresponding actions performed by each of the respective users). One or more techniques (e.g., voice identification, face identification, device ID identification, etc.) can be utilized to identify the respective user, and cause the automated assistant to utilize the respective instance of the ambient sensing ML model associated with the respective user. Accordingly, the techniques described herein can be utilized to personalize the one or more suggested actions for each of the respective users. For example, the automated assistant may generate an indication of a weather action, a traffic action, and a car start action for a first user associated with the assistant devices based on a cooking or breakfast ambient state as described with respect to FIG. 5A. However, the automated assistant may generate an indication of a news action for a second user associated with the assistant devices based on the same cooking or breakfast ambient state. These different suggested actions for the different users can be presented (or automatically performed) by the same assistant device or different assistant devices.

Figure 6:
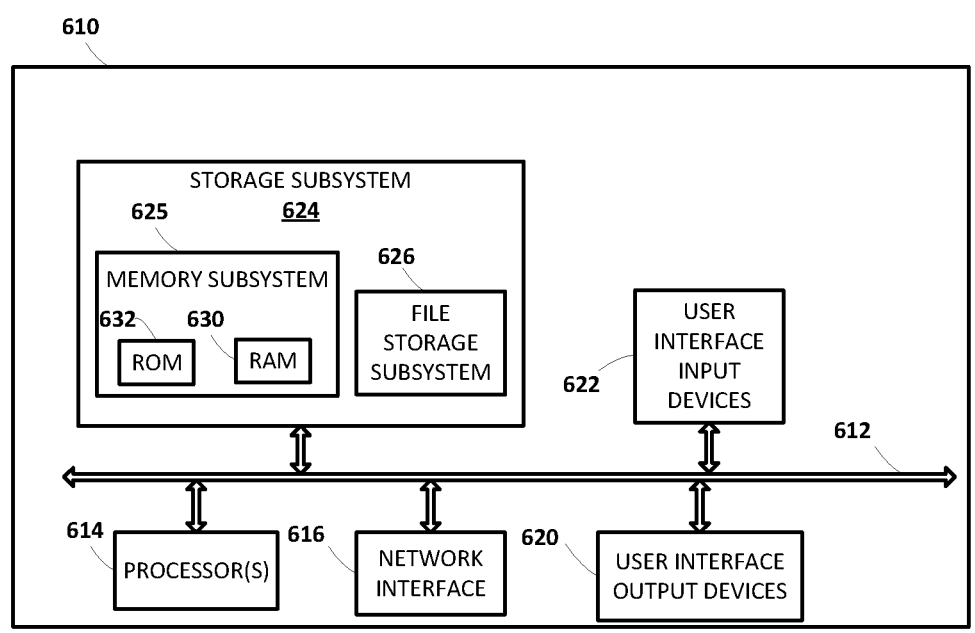
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of assistant input devices, one or more of cloud-based automated assistant components, one or more assistant non-input systems, one or more assistant non-input devices, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes: determining that an instance of sensor data corresponds to an ambient sensing event; identifying a temporally corresponding action performed within a threshold duration of time of the ambient sensing event, the temporally corresponding action being a user-initiated action performed by the user via the assistant device or an additional assistant device of the user; and in response to identifying the temporally corresponding action: generating, at the assistant device, and based on the instance of the sensor data and the temporally corresponding action, a training instance to be utilized in training an ambient sensing machine learning (ML) model; and causing the ambient sensing ML model to be trained based on the training instance.

These and other implementations of the technology disclosed herein can include one or more of the following features.

In some implementations, the training instance can include training instance input and training instance output. The training instance input can include the instance of the sensor data, and the training instance output can include an indication of the temporally corresponding action.

In some versions of those implementations, the instance of the sensor data can include an instance of audio data captured by one or more microphones of the assistant device, and the training instance input can include an ambient state associated with an inferred activity of the user that is inferred based on processing the instance of the audio data.

In additional or alternative versions of those implementations, the instance of the sensor data can include an instance of audio data captured by one or more microphones of the assistant device, and the training instance input can include an ambient state associated with an inferred location of the user that is inferred based on processing the instance of the audio data.

In additional or alternative versions of those implementations, the instance of the sensor data can include an instance of motion data captured by an accelerometer or GPS sensor of the assistant device, and the training instance input can include an ambient state associated with an inferred activity of the user that is inferred based on processing the instance of the motion data.

In additional or alternative versions of those implementations, the instance of the sensor data can include an instance of motion data captured by an accelerometer or GPS sensor of the assistant device, and the training instance input can include an inferred location of the user that is inferred based on processing the instance of the motion data.

In additional or alternative versions of those implementations, the instance of the sensor data can include an instance of pairing data identified based on the assistant device pairing with a client device of the user, and the training instance input can include the pairing data.

In some implementations, the method can further include detecting, via one or more additional sensors of the additional assistant device, that an additional instance of additional sensor data corresponds to the ambient sensing event. Generating the training instance can be further based on the additional instance of the additional sensor data.

In some implementations, identifying the temporally corresponding action can include receiving, from the user, user input that causes one or more of the assistant devices or the additional assistant device to perform the user-initiated action within the threshold duration of time of the ambient sensing event.

In some implementations, the threshold duration of time can include a first portion of time preceding the ambient sensing event, and the threshold duration of time can also include a second portion of time subsequent to the ambient sensing event. In some implementations, the threshold duration of time is subsequent to the ambient sensing event. In some implementations, the threshold duration of time can be determined based on a type of the ambient sensing event.

In some implementations, the method can further include subsequent to causing the ambient sensing ML model to be trained based on the training instance and the plurality of additional training instances: causing the assistant device to utilize the ambient sensing ML model in generating one or more suggested actions that are suggested to be performed by the assistant device or the additional assistant device, on behalf of the user, based on processing an additional instance of the sensor data; and causing a representation of one or more of the suggested actions to be provided for presentation to the user via the assistant device or the additional assistant device.

In some versions of those implementations, the method can further include, in response to receiving a user selection of one or more of the actions: utilizing the user selection as a positive feedback signal for updating the trained ambient sensing ML model. In additional or alternative implementations, the method can further include, in response to receiving no user selection of one or more of the actions, utilizing the lack of the user selection as a negative feedback signal for updating the trained ambient sensing ML model.

In some implementations, generating the training instance can be further based on one or more of a time or day of week when the instance of the sensor data that corresponds to the ambient sensing event is detected.

In some implementations, a method implemented by one or more processors is provided, and includes: determining an ambient state based on an instance of sensor data, the instance of the sensor data being detected via one or more sensors of an assistant device of a user, and the ambient state reflecting a state of the user or an environment of the user; processing, using a trained ambient sensing machine learning (ML) model, the ambient state to generate one or more suggested actions that are suggested to be performed, on behalf of the user, by the assistant device or an additional assistant device of the user; causing a corresponding representation of one or more of the suggested action to be provided for presentation to the user via the assistant device or the additional assistant device; and in response to receiving a user selection of the corresponding representation of one or more of the suggested actions: causing one or more of the suggested actions to be performed, on behalf of the user, by the assistant device or the additional assistant device.

These and other implementations of the technology disclosed herein can include one or more of the following features.

In some implementations, each of the one or more suggested actions is associated with a predicted measure. In some versions of those implementations, causing the representation of the one or more suggested actions to be provided for presentation to the user can be in response to determining that the predicted measure associated with each of the one or more suggested actions satisfies a first threshold measure and in response to determining that the predicted measure associated with each of the one or more suggested actions fails to satisfy a second threshold measure.

In some implementations, causing the corresponding representation of the one or more suggested actions to be provided for presentation to the user via the assistant device or the additional assistant device can include causing a corresponding selectable element, for each of the one or more suggested actions, to be visually rendered at a display of the assistant device or the additional assistant device. In some implementations, receiving the user selection of the corresponding representation of one or more of the suggested actions can include receiving the user selection of a given corresponding selectable element of the corresponding selectable elements.

In some implementations, causing the corresponding representation of the one or more suggested actions to be provided for presentation to the user via the assistant device or the additional assistant device can include causing an indication of the one or more suggested actions to be audibly rendered at one or more speakers of the assistant device or the additional assistant device. In some versions of those implementations, receiving the user selection of the corresponding representation of one or more of the suggested actions can include receiving the user selection via a spoken utterance of the user that is detected via one or more microphones of the assistant device or the additional assistant device.

In some implementations, the method can further include causing an indication of the ambient state to be provided for presentation to the user along with the representation of the one or more actions.

In some implementations, determining the ambient state based on the instance of sensor data can include processing the instance of the sensor data to determine the ambient state. In some versions of those implementations, the instance of the sensor data captures one or more of: audio data, motion data, or pairing data.

In some implementations, a method implemented by one or more processors is provided, and includes: determining an ambient state based on an instance of sensor data, the instance of the sensor data being detected via one or more sensors of an assistant device of a user, and the ambient state reflecting a state of the user or an environment of the user; processing, using a trained ambient sensing machine learning (ML) model, the ambient state to generate one or more suggested actions that are suggested to be performed, on behalf of the user, by the assistant device or an additional assistant device of the user; and causing one or more of the suggested actions to be automatically performed, on behalf of the user, by the assistant device or the additional assistant device.

These and other implementations of the technology disclosed herein can include one or more of the following features.

In some implementations, each of the one or more suggested actions can be associated with a predicted measure. In some versions of those implementations, causing one or more of the suggested actions to be automatically performed by the assistant device or the additional assistant device can be in response to determining that the predicted measure associated with each of the one or more suggested actions satisfies a first threshold measure and in response to determining that the predicted measure associated with each of the one or more suggested actions satisfies a second threshold measure.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising: determining an occurrence of an ambient state based on an instance of sensor data, the instance of the sensor data being detected via one or more sensors of an assistant device of a user, the instance of the sensor data including at least an instance of pairing data that captures a connection of multiple assistant devices in the environment of the user over one or more networks, the multiple assistant devices in the environment including at the assistant device and an additional assistant device of the user, and the ambient state reflecting a state of the user or an environment of the user; processing, using a trained ambient sensing machine learning (ML) model, at least the instance of pairing data utilized to determine the ambient state to infer a suggested routine for the ambient state, the suggested routine including multiple suggested actions that are suggested to be performed, on behalf of the user, by the assistant device or the additional assistant device; causing a corresponding representation of the suggested routine, to be provided for presentation to the user via the assistant device or the additional assistant device, the corresponding representation of the suggested routine including at least an indication of each of the multiple suggested actions included in the suggested routine; generating, based on a user selection of the corresponding representation of the suggested routine, a routine for the ambient state; and subsequent to generating the routine: identifying a subsequent occurrence of the ambient state based on an additional instance of sensor data, the additional instance of the sensor data being detected via one or more of the sensors of the assistant device of the additional assistant device; and causing the multiple suggested actions to be automatically performed as the routine, on behalf of the user and based on identifying the subsequent occurrence of the ambient state, by the assistant device or the additional assistant device.

2. The method of claim 1, wherein each of the multiple suggested actions is associated with a predicted measure.

3. The method of claim 2, wherein causing the multiple suggested actions to be automatically performed by the assistant device or the additional assistant device is in response to determining that the predicted measure associated with each of the multiple suggested actions satisfies a first threshold measure and in response to determining that the predicted measure associated with each of the multiple suggested actions satisfies a second threshold measure.

* * * * *